(12) United States Patent
Zhao

(10) Patent No.: US 12,463,535 B2
(45) Date of Patent: Nov. 4, 2025

(54) SWITCHED-CAPACITOR VOLTAGE CONVERSION CIRCUIT, VOLTAGE CONVERTER, AND CHIP

(71) Applicant: Southchip Semiconductor Technology (Shanghai) Co., Ltd., Shanghai (CN)

(72) Inventor: Wei Zhao, Shanghai (CN)

(73) Assignee: Southchip Semiconductor Technology (Shanghai) Co., Ltd., Shanghai (CN)

( * ) Notice: Subject to any disclaimer, the term of this patent is extended or adjusted under 35 U.S.C. 154(b) by 110 days.

(21) Appl. No.: 18/495,734

(22) Filed: Oct. 26, 2023

(65) Prior Publication Data

US 2024/0171068 A1    May 23, 2024

(30) Foreign Application Priority Data

Nov. 22, 2022 (CN) .......................... 202211466027.0

(51) Int. Cl.
*H02M 3/07* (2006.01)

(52) U.S. Cl.
CPC ...................................... *H02M 3/07* (2013.01)

(58) Field of Classification Search
CPC ........ H02M 3/07; H02M 3/072; H02M 3/077; H02M 1/0095; H02M 1/08
See application file for complete search history.

(56) References Cited

U.S. PATENT DOCUMENTS

| | | | |
|---|---|---|---|
| 2020/0091817 A1* | 3/2020 | Teplechuk | H02M 3/07 |
| 2022/0231601 A1* | 7/2022 | Jong | H02M 1/0043 |
| 2022/0263410 A1* | 8/2022 | Saggini | H02M 3/07 |
| 2022/0286048 A1* | 9/2022 | Rana | H02M 3/071 |
| 2023/0034786 A1* | 2/2023 | Dago | H02M 3/00 |

FOREIGN PATENT DOCUMENTS

| | | |
|---|---|---|
| CN | 112583254 | 3/2021 |
| CN | 113228486 | 8/2021 |
| CN | 113824197 | 12/2021 |
| CN | 114244105 | 3/2022 |
| CN | 114400890 | 4/2022 |

* cited by examiner

*Primary Examiner* — Sibin Chen

(57) ABSTRACT

A switched-capacitor voltage conversion circuit includes a first pathway and a second pathway. A first terminal of the first pathway and a first terminal of the second pathway are both electrically connected to an input terminal of the switched-capacitor voltage conversion circuit. The input terminal is connected to an input voltage. A second terminal of the first pathway is electrically connected to a third terminal of the second pathway. A third terminal of the first pathway is electrically connected to a second terminal of the second pathway. A fourth terminal of the first pathway and a fourth terminal of the second pathway are both electrically connected to a first output terminal of the switched-capacitor voltage conversion circuit. A fifth terminal of the first pathway is electrically connected to a fifth terminal of the second pathway.

20 Claims, 10 Drawing Sheets

SWITCHED-CAPACITOR VOLTAGE CONVERSION CIRCUIT, VOLTAGE CONVERTER, AND CHIP

CROSS-REFERENCE TO RELATED APPLICATION

This application is based upon and claims the priority of Chinese Patent Application No. 202211466027.0, filed on Nov. 22, 2022, the entire content of which is hereby incorporated by reference herein and made a part of this specification.

TECHNICAL FIELD

Embodiments of the present disclosure relate to the technical field of voltage conversion, and in particular, relate to a switched-capacitor voltage conversion circuit, a voltage converter, and a chip.

BACKGROUND

A charge pump is also referred to as a switched-capacitor voltage converter, and is a direct current to direct current (DC-DC) converter which stores energy using a capacitor. Since a charge pump circuit does not include an inductor, during use, power consumption is low, and therefore, the charge pump may be widely used in various fields. The charge pump includes a boost charge pump and a buck charge pump. The boost charge pump is configured to boost an input voltage and output a boosted voltage, and the buck charge pump is configured to buck an input voltage and output a bucked voltage. For example, a ¼ buck charge pump is configured to buck an output voltage to ¼ of an input voltage, that is, the input voltage is four times the output voltage, and an input current is ¼ of an output current.

A conventional two-way parallel-connected 4:1 Dickson switched-capacitor voltage conversion circuit is as illustrated in FIG. 1. The switched-capacitor voltage conversion circuit includes six capacitors CF1A, CF2A, CF3A, CF1B, CF2B, and CF3B, and sixteen switches Q1 to Q16. By controlling on or off states of the switches Q1 to Q16, based on the capacitors CF1A, CF2A, CF3A, CF1B, CF2B, and CF3B, an output voltage is ¼ of an input voltage, that is, $V_{out}=V_{in}/4$, and an output current $I_{out}$ is four times an input current $I_{in}$, that is, $I_{out}$ is equal to $4*I_{in}$.

However, for the conventional switched-capacitor voltage conversion circuit implementing the output voltage to be ¼ of the input voltage, a large number of capacitors are used. As a result, the number of devices or elements in the switched-capacitor voltage conversion circuit is large, and thus the area occupied by the switched-capacitor voltage conversion circuit is large, which is not conducive to miniaturization of the circuit.

SUMMARY

In view of the above problem, embodiments of the present disclosure provide a switched-capacitor voltage conversion circuit, a voltage converter, and a chip, which are capable of reducing the number of capacitors, that is, reducing the number of devices and elements in the switched-capacitor voltage conversion circuit. In this way, the area occupied by the switched-capacitor voltage conversion circuit is reduced, and miniaturization of the switched-capacitor voltage conversion circuit is facilitated.

In a first aspect, the embodiments of the present disclosure provide a switched-capacitor voltage conversion circuit. The switched-capacitor voltage conversion circuit includes: a first pathway and a second pathway.

A first terminal of the first pathway and a first terminal of the second pathway are both electrically connected to an input terminal of the switched-capacitor voltage conversion circuit, the input terminal of the switched-capacitor voltage conversion circuit is connected to an input voltage, a second terminal of the first pathway is electrically connected to a third terminal of the second pathway, a third terminal of the first pathway is electrically connected to a second terminal of the second pathway, a fourth terminal of the first pathway and a fourth terminal of the second pathway are both electrically connected to a first output terminal of the switched-capacitor voltage conversion circuit, and a fifth terminal of the first pathway is electrically connected to a fifth terminal of the second pathway.

The first pathway includes a first capacitor, a second capacitor, and a first switch assembly, and the second pathway includes a third capacitor, a fourth capacitor, and a second switch assembly, a switch assembly including the first switch assembly and the second switch assembly.

The switch assembly is configured to control a connection between any two of the first capacitor, the second capacitor, the third capacitor, and the fourth capacitor.

The switched-capacitor voltage conversion circuit is configured to convert the input voltage to a first output voltage, and output the first output voltage via the first output terminal of the switched-capacitor voltage conversion circuit, wherein the input voltage is four times of the first output voltage.

In some embodiments, the first switch assembly includes a first switch, a second switch, a third switch, a fourth switch, a fifth switch, a sixth switch, a seventh switch, and an eighth switch; and the second switch assembly includes a ninth switch, a tenth switch, an eleventh switch, a twelfth switch, a thirteenth switch, a fourteenth switch, a fifteenth switch, and a sixteenth switch.

The input terminal of the switched-capacitor voltage conversion circuit is electrically connected to a first terminal of the third switch and a first plate of the first capacitor via the second switch, and the input terminal of the switched-capacitor voltage conversion circuit is further electrically connected to a first terminal of the eleventh switch and a first plate of the third capacitor via the tenth switch; a second terminal of the third switch is electrically connected to a first terminal of the fifth switch, a second terminal of the fifth switch is electrically connected to a first terminal of the twelfth switch, a first terminal of the fourteenth switch, and a first plate of the fourth capacitor, a second terminal of the eleventh switch is electrically connected to a first terminal of the thirteenth switch, and a second terminal of the thirteenth switch is electrically connected to a first terminal of the fourth switch, a first terminal of the sixth switch, and a first plate of the second capacitor; and a connection point between the second terminal of the third switch and the second terminal of the eleventh switch is connected to the ground via a second sub-capacitor.

A second terminal of the fourth switch is electrically connected to a second plate of the first capacitor and a first terminal of the first switch, and a second terminal of the first switch is connected to the ground; and a second terminal of the twelfth switch is electrically connected to a second plate of the third capacitor and a first terminal of the ninth switch, and a second terminal of the ninth switch is connected to the ground.

A second plate of the second capacitor is electrically connected to a second terminal of the sixth switch via the seventh switch, and the second plate of the second capacitor is further connected to the ground via the eighth switch; a second plate of the fourth capacitor is electrically connected to a second terminal of the fourteenth switch via the fifteenth switch, and the second plate of the fourth capacitor is further connected to the ground via the sixteenth switch; and a connection point between a second terminal of the sixth switch and the second terminal of the fourteenth switch is connected to the ground via a first sub-capacitor.

In some embodiments, the connection point between the second terminal of the sixth switch and the second terminal of the fourteenth switch is electrically connected to the first output terminal of the switched-capacitor voltage conversion circuit.

In some embodiments, the switched-capacitor voltage conversion circuit is configured to, in a first operating mode, convert the input voltage to the first output voltage, the first operating mode is that the switch assembly operates in a first state or a second state.

In the first state, the second switch, the fourth switch, the seventh switch, the ninth switch, the eleventh switch, the thirteenth switch, the fourteenth switch, and the sixteenth switch are all turned on, and the first switch, the third switch, the fifth switch, the sixth switch, the eighth switch, the tenth switch, the twelfth switch, and the fifteenth switch are all turned off; and in the second state, the second switch, the fourth switch, the seventh switch, the ninth switch, the eleventh switch, the thirteenth switch, the fourteenth switch, and the sixteenth switch are all turned off, and the first switch, the third switch, the fifth switch, the sixth switch, the eighth switch, the tenth switch, the twelfth switch, and the fifteenth switch are all turned on.

In some embodiments, the switched-capacitor voltage conversion circuit is further configured to, in a second operating mode, convert the input voltage to a second output voltage, and output the second output voltage via the first output terminal, the second operating mode is that the switch assembly operates in a third state or a fourth state.

In the third state, the second switch, the third switch, the fifth switch, the sixth switch, the eighth switch, the tenth switch, the eleventh switch, and the fifteenth switch are all turned on, and the first switch, the fourth switch, the seventh switch, the ninth switch, the twelfth switch, the thirteenth switch, the fourteenth switch, and the sixteenth switch are all turned off; and in the fourth state, the second switch, the third switch, the seventh switch, the tenth switch, the eleventh switch, the thirteenth switch, the fourteenth switch, and the sixteenth switch are all turned on, and the first switch, the fourth switch, the fifth switch, the sixth switch, the eighth switch, the ninth switch, the twelfth switch, and the fifteenth switch are all turned off.

In some embodiments, the switched-capacitor voltage conversion circuit is further configured to, in a third operating mode, convert the input voltage of the switched-capacitor voltage conversion circuit to a third output voltage, and output the third output voltage via the first output terminal.

In the third operating mode, the second switch, the third switch, the fifth switch, the sixth switch, the tenth switch, the eleventh switch, the thirteenth switch, and the fourteenth switch are all turned on, and the first switch, the fourth switch, the seventh switch, the eighth switch, the ninth switch, the twelfth switch, the fifteenth switch, and the sixteenth switch are all turned off.

In some embodiments, the connection point between the second terminal of the third switch and the second terminal of the eleventh switch is electrically connected to a second output terminal of the switched-capacitor voltage conversion circuit.

In some embodiments, the switched-capacitor voltage conversion circuit is further configured to, in a first operating mode, convert the input voltage to a fourth output voltage, and output the fourth output voltage via the second output terminal.

In some embodiments, the switched-capacitor voltage conversion circuit is further configured to, in a second operating mode, convert the input voltage to a fifth output voltage, and output the fifth output voltage via the second output terminal.

In some embodiments, the switched-capacitor voltage conversion circuit is further configured to, in a third operating mode, convert the input voltage to a sixth output voltage, and output the sixth output voltage via the second output terminal.

In a second aspect, the embodiments of the present disclosure provide a voltage converter. The voltage converter includes: any switched-capacitor voltage conversion circuit according to the first aspect.

In a third aspect, the embodiments of the present disclosure provide a chip. The chip includes: any switched-capacitor voltage conversion circuit according to the first aspect.

In the technical solutions according to the embodiments of the present disclosure, the switched-capacitor voltage conversion circuit includes: a first pathway and a second pathway. A first terminal of the first pathway and a first terminal of the second pathway are both electrically connected to an input terminal of the switched-capacitor voltage conversion circuit. The input terminal is connected to an input voltage. A second terminal of the first pathway is electrically connected to a third terminal of the second pathway. A third terminal of the first pathway is electrically connected to a second terminal of the second pathway. A fourth terminal of the first pathway and a fourth terminal of the second pathway are both electrically connected to a first output terminal of the switched-capacitor voltage conversion circuit. A fifth terminal of the first pathway is electrically connected to a fifth terminal of the second pathway. The first pathway includes a first capacitor, a second capacitor, and a first switch assembly. The second pathway includes a third capacitor, a fourth capacitor, and a second switch assembly. Further, a switch assembly includes the first switch assembly and the second switch assembly. The switch assembly is capable of controlling connections of the first capacitor, the second capacitor, the third capacitor, and the fourth capacitor. The switched-capacitor voltage conversion circuit is capable of converting the input voltage to a first output voltage, and outputting the first output voltage via the first output terminal, wherein the input voltage is four times of the first output voltage. As such, based on the four capacitors, the switched-capacitor voltage conversion circuit implements 4:1 bucking function for the input voltage, and is capable of reducing the number of capacitors, that is, reducing the number of devices and elements in the switched-capacitor voltage conversion circuit. In this way, the area occupied by the switched-capacitor voltage conversion circuit is reduced, and miniaturization of the switched-capacitor voltage conversion circuit is facilitated.

The above description only summarizes the technical solutions of the embodiments of the present disclosure. Specific embodiments of the present disclosure are described hereinafter to better and clearer understand the technical solutions of the embodiments of the present disclosure, to practice the technical solutions based on the disclosure of the specification and to make the above and other objectives, features and advantages of the embodiments of the present disclosure more apparent and understandable.

BRIEF DESCRIPTION OF THE DRAWINGS

For clearer descriptions of technical solutions according to the embodiments of the present disclosure, drawings that are to be referred for description of the embodiments are briefly described hereinafter. Apparently, the drawings described hereinafter merely illustrate some embodiments of the present disclosure. Persons of ordinary skill in the art may also derive other drawings based on the drawings described herein without any creative effort.

DETAILED DESCRIPTION

Figure 1:
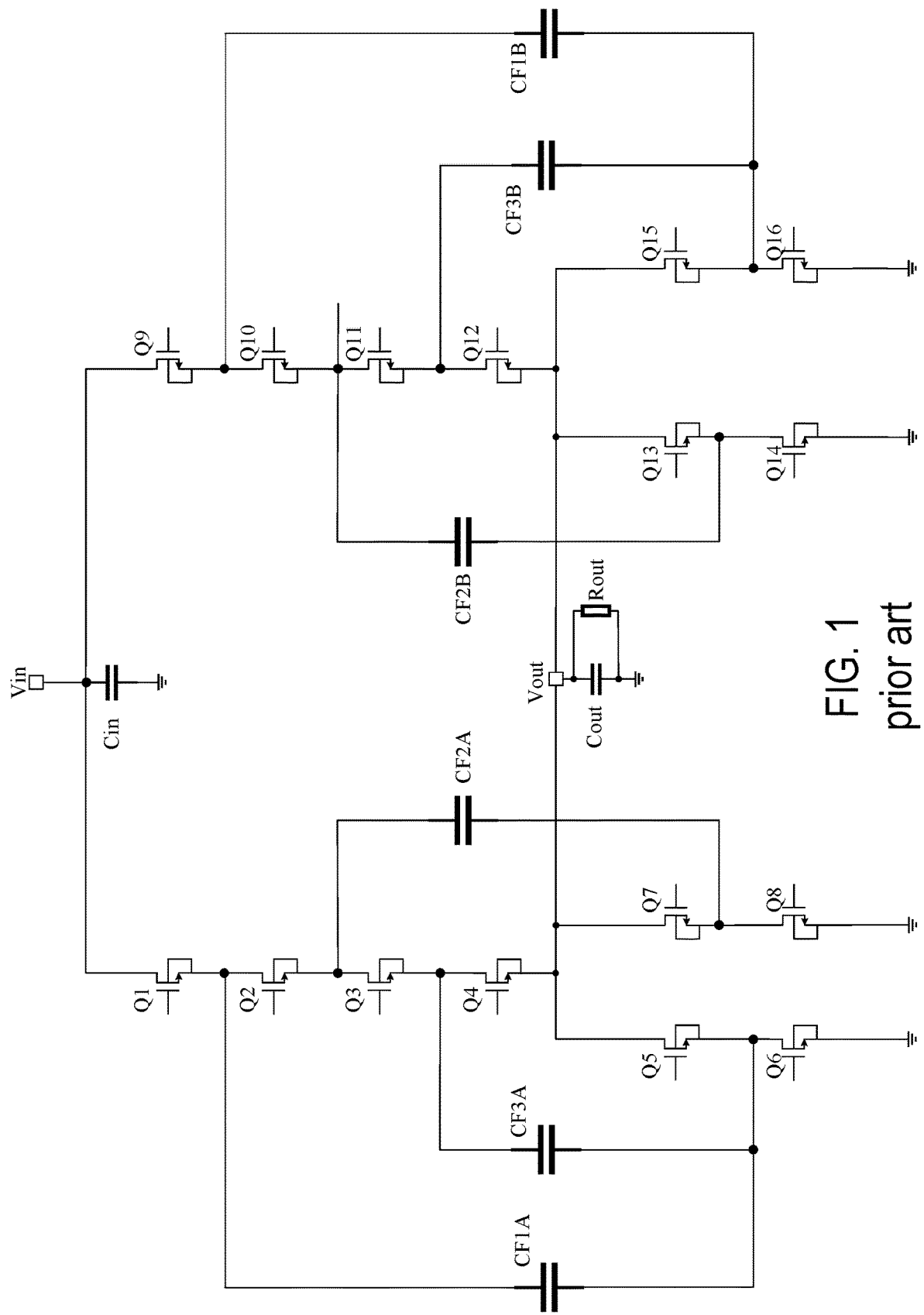
FIG. 1 is a schematic structural diagram of a dual-circuit parallel 4:1 Dickson switched-capacitor voltage conversion circuit in the related art.

For clearer descriptions of the objectives, technical solutions, and advantages of the embodiments of the present disclosure, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Unless defined otherwise, all technical and scientific terms used herein have the same meaning as commonly understood by persons of ordinary skill in the art. The terms used herein in the specification of present disclosure are only intended to illustrate the specific embodiments of the present disclosure, instead of limiting the present disclosure. The terms "comprise," "include," and any variations thereof in the specification, claims, and the description of the drawings of the present disclosure are intended to cover a non-exclusive inclusion.

The terms "example" and "embodiment" in this specification signify that the specific characteristic, structures or features described with reference to the embodiments may be covered in at least one embodiment of the present disclosure. The term "embodiment," when used in various positions of the description, neither indicates the same embodiment, nor indicates an independent or optional embodiment that is exclusive of the other embodiments. A person skilled in the art would implicitly or explicitly understand that the embodiments described in this specification may be incorporated with other embodiments.

Terms such as "first," "second," and the like in the specifications, claims and the accompanying drawings of the present disclosure are intended to distinguish different objects but are not intended to define a specific sequence. Such terms may explicitly or implicitly indicate one or more such features.

In the description of the present disclosure, unless otherwise explicitly specified and defined, the terms "connected," "coupled," and derivatives forms thereof shall be understood in a broad sense. For example, the terms "connected," "coupled," and derivatives form thereof for depicting the circuit structure, in addition to physical connection, may also be understood as electrical connections or signal connection. The connection, for example, may be direct connection, i.e., the physical connection or, indirect connection via at least one intermediate element as long as the circuit is conducted, or communication between the interiors of two elements. The signal connection, in addition to signal connection via a circuitry, may also be signal connection via a communication medium, for example, radio waves.

The term "and/or" is merely an association relationship for describing associated objects, which represents that there may exist three types of relationships, for example, A and/or B may represent three situations: A exists, both A and B exist, and B exists. In addition, the symbol "/" generally represents an "or" relationship between associated objects before and after the symbol.

In the description of the embodiments of the present disclosure, the terms "a plurality of" and "at least two" signify two or more, unless otherwise specified. Likewise, the terms "a plurality of groups" and "at least two groups" signify two or more groups (including two groups). To make a person skilled in the art better understand the technical solutions of the embodiments of the present disclosure, the technical solutions of the present disclosure are clearly and completely described with reference to the accompanying drawings of the embodiments of the present disclosure.

Figure 2:
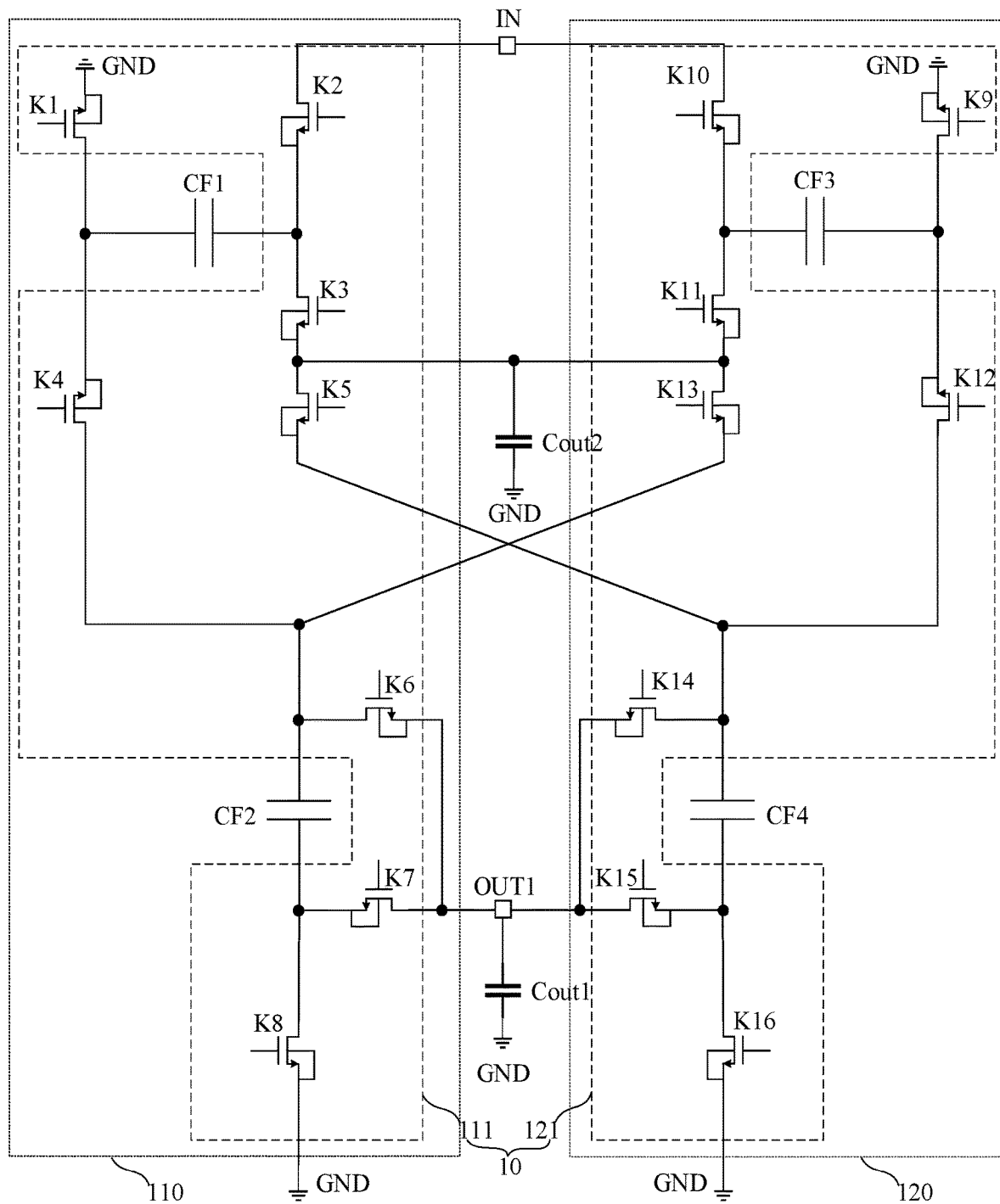
FIG. 2 is a schematic structural diagram of a switched-capacitor voltage conversion circuit according to an embodiment of the present disclosure.

FIG. 2 is a schematic structural diagram of a switched-capacitor voltage conversion circuit 100 according to an embodiment of the present disclosure. As illustrated in FIG. 2, the switched-capacitor voltage conversion circuit 100 includes a first pathway 110 and a second pathway 120.

A first terminal of the first pathway 110 and a first terminal of the second pathway 120 are both electrically connected to an input terminal IN of the switched-capacitor voltage conversion circuit 100, the input terminal IN of the switched-capacitor voltage conversion circuit 100 is connected to an input voltage $V_{in}$, a second terminal of the first pathway 110 is electrically connected to a third terminal of the second pathway 120, a third terminal of the first pathway 110 is electrically connected to a second terminal of the second pathway 120, a fourth terminal of the first pathway 110 and a fourth terminal of the second pathway 120 are both electrically connected to a first output terminal OUT1 of the switched-capacitor voltage conversion circuit 100, and a fifth terminal of the first pathway 110 is electrically connected to a fifth terminal of the second pathway 120.

The first pathway 110 includes a first capacitor CF1, a second capacitor CF2, and a first switch assembly 111; and the second pathway 120 includes a third capacitor CF3, a fourth capacitor CF4, and a second switch assembly 121, wherein a switch assembly 10 includes the first switch assembly 111 and the second switch assembly 121.

The switch assembly 10 is configured to control a connection between any two of the first capacitor CF1, the second capacitor CF2, the third capacitor CF3, and the fourth capacitor CF4. The switched-capacitor voltage conversion circuit 100 is configured to convert an input voltage $V_{in}$ to a first output voltage $V_{out1}$, and output the first output voltage $V_{out1}$ via the first output terminal OUT1, the input voltage $V_{in}$ is four times of the first output voltage $V_{out1}$.

In some embodiments, as illustrated in FIG. 2, the first switch assembly 111 includes a first switch K1, a second switch K2, a third switch K3, a fourth switch K4, a fifth switch K5, a sixth switch K6, a seventh switch K7, and an eighth switch K8; and the second switch assembly 121 includes a ninth switch K9, a tenth switch K10, an eleventh switch K11, a twelfth switch K12, a thirteenth switch K13, a fourteenth switch K14, a fifteenth switch K15, and a sixteenth switch K16.

The input terminal IN of the switched-capacitor voltage conversion circuit 100 is electrically connected to a first terminal of the third switch K3 and a first plate of the first capacitor CF1 via the second switch K2, and the input terminal IN of the switched-capacitor voltage conversion circuit 100 is further electrically connected to a first terminal of the eleventh switch K11 and a first plate of the third capacitor CF3 via the tenth switch K10; a second terminal of the third switch K3 is electrically connected to a first terminal of the fifth switch K5, a second terminal of the fifth switch K5 is electrically connected to a first terminal of the twelfth switch K12, a first terminal of the fourteenth switch K14, and a first plate of the fourth capacitor CF4, a second terminal of the eleventh switch K11 is electrically connected to a first terminal of the thirteenth switch K13, and a second terminal of the thirteenth switch K13 is electrically connected to a first terminal of the fourth switch K4, a first terminal of the sixth switch K6, and a first plate of the second capacitor CF2; and a connection point between the second terminal of the third switch K3 and the second terminal of the eleventh switch K11 is connected to the ground via a second sub-capacitor Cout2.

A second terminal of the fourth switch K4 is electrically connected to a second plate of the first capacitor CF1 and a first terminal of the first switch K1, and a second terminal of the first switch K1 is connected to the ground; and a second terminal of the twelfth switch K12 is electrically connected to a second plate of the third capacitor CF3 and a first terminal of the ninth switch K9, and a second terminal of the ninth switch K9 is connected to the ground. A second plate of the second capacitor CF2 is electrically connected to a second terminal of the sixth switch K6 via the seventh switch K7, and the second plate of the second capacitor CF2 is further connected to the ground via the eighth switch K8; a second plate of the fourth capacitor CF4 is electrically connected to a second terminal of the fourteenth switch K14 via the fifteenth switch K15, and the second plate of the fourth capacitor CF4 is further connected to the ground via the sixteenth switch K16; and a connection point between a second terminal of the sixth switch K6 and the second terminal of the fourteenth switch K14 is connected to the ground via a first sub-capacitor Cout1.

As illustrated in FIG. 2, the first terminal of the first pathway 110 is a first terminal of the second switch K2, and is electrically connected to the input voltage $V_{in}$; and the first terminal of the second pathway 120 is a first terminal of the tenth switch K10, and is electrically connected to the input voltage $V_{in}$. The second terminal of the first pathway 110 is the second terminal of the fifth switch K5, and the third terminal of the first pathway 110 is the first terminal of the sixth switch K6; and the second terminal of the second pathway 120 is the second terminal of the thirteenth switch K13, and the third terminal of the second pathway 120 is the first terminal of the fourteenth switch K14. Since the second terminal of the fifth switch K5 is electrically connected to the first terminal of the fourteenth switch K14, and the second terminal of the thirteenth switch K13 is electrically connected to the first terminal of the sixth switch K6, the second terminal of the first pathway 110 is electrically connected to the third terminal of the second pathway 120, and the third terminal of the first pathway 110 is electrically connected to the second terminal of the second pathway 120.

The first plate of the first capacitor CF1 is electrically connected to the second plate of the third capacitor CF3 via the third switch K3, the fifth switch K5, and the twelfth switch K12, and the first plate of the first capacitor CF1 is further electrically connected to the first plate of the third capacitor CF3 via the second switch K2 and the tenth switch K10. As such, by controlling respective on or off states of the second switch K2, the third switch K3, the fifth switch K5, the tenth switch K10, and the twelfth switch K12, series-connection or parallel-connection between the first capacitor CF1 and the third capacitor CF3 is achieved. The first plate of the first capacitor CF1 is electrically connected to the first plate of the fourth capacitor CF4 via the third switch K3 and the fifth switch K5, and the first plate of the first capacitor CF1 is further electrically connected to the second plate of the fourth capacitor CF4 via the second switch K2, the tenth switch K10, the eleventh switch K11, the thirteenth switch K13, the sixth switch K6, and the fifteenth switch K15. As such, by controlling respective on or off states of the second switch K2, the third switch K3, the fifth switch K5, the sixth switch K6, the tenth switch K10, the eleventh switch K11, the thirteenth switch K13, and the fifteenth switch K15, series-connection or parallel-connection between the first capacitor CF1 and the fourth capacitor CF4 is achieved. The first plate of the first capacitor CF1 is electrically connected to the first plate of the second capacitor CF2 via the second switch K2, the tenth switch K10, the eleventh switch K11, and the thirteenth switch K13, and the first plate of the first capacitor CF1 is further electrically connected to the second plate of the second capacitor CF2 via the third switch K3, the fifth switch K5, the fourteenth switch K14, and the seventh switch K7. As such, by controlling respective on or off states of the second switch K2, the third switch K3, the fifth switch K5, the seventh switch K7, the tenth switch K10, the eleventh switch K11, the thirteenth switch K13, and the fourteenth switch K14, series-connection or parallel-connection between the first capacitor CF1 and the second capacitor CF2 is achieved.

The first plate of the second capacitor CF2 is electrically connected to the first plate of the third capacitor CF3 via the thirteenth switch K13 and the eleventh switch K11, and the first plate of the second capacitor CF2 is further electrically connected to the second plate of the third capacitor CF3 via the sixth switch K6, the fourteenth switch K14, and the twelfth switch K12. As such, by controlling respective on or off states of the sixth switch K6, the eleventh switch K11, the twelfth switch K12, the thirteenth switch K13, and the fourteenth switch K14, series-connection or parallel-connection between the second capacitor CF2 and the third capacitor CF3 is achieved. The first plate of the second capacitor CF2 is electrically connected to the first plate of the fourth capacitor CF4 via the sixth switch K6 and the fourteenth switch K14, and the first plate of the second capacitor CF2 is further electrically connected to the second plate of the fourth capacitor CF4 via the sixth switch K6 and the fifteenth switch K15. As such, by controlling respective on or off states of the sixth switch K6, the fourteenth switch K14, and the fifteenth switch K15, series-connection or parallel-connection between the second capacitor CF2 and the fourth capacitor CF4 is achieved.

The first plate of the third capacitor CF3 is electrically connected to the first plate of the fourth capacitor CF4 via the tenth switch K10, the second switch K2, the third switch K3, and the fifth switch K5, and the first plate of the third capacitor CF3 is further electrically connected to the second plate of the fourth capacitor CF4 via the eleventh switch K11, the thirteenth switch K13, the sixth switch K6, and the fifteenth switch K15. As such, by controlling respective on or off states of the second switch K2, the third switch K3, the fifth switch K5, the sixth switch K6, the tenth switch K10, the eleventh switch K11, the thirteenth switch K13, and the fifteenth switch K15, series-connection or parallel-connection between the third capacitor CF3 and the fourth capacitor CF4 is achieved.

In summary, by controlling respective on or off states of the switches in the switch assembly 10, a connection between any two of the first capacitor CF1, the second capacitor CF2, the third capacitor CF3, and the fourth capacitor CF4 is controlled. For example, in the case that the second switch K2, the fourth switch K4, the seventh switch K7, the ninth switch K9, the eleventh switch K11, the thirteenth switch K13, the fourteenth switch K14, and the sixteenth switch K16 are all turned on, and the first switch K1, the third switch K3, the fifth switch K5, the sixth switch K6, the eighth switch K8, the tenth switch K10, the twelfth switch K12, and the fifteenth switch K15 are all turned off, the second capacitor CF2 is connected in series to the fourth capacitor CF4, the second capacitor CF2 and fourth capacitor CF4 which are connected in series are connected in parallel to the third capacitor CF3, and then a circuit formed by the second capacitor CF2, the fourth capacitor CF4 and the third capacitor CF3 is connected in series to the first capacitor CF1.

The second terminal of the sixth switch K6 is the fourth terminal of the first pathway 110, and the second terminal of the fourteenth switch K14 is the fourth terminal of the second pathway 120. As illustrated in FIG. 2, the second terminal of the sixth switch K6 is electrically connected to the second terminal of the fourteenth switch K14, and the second terminal of the sixth switch K6 and the second terminal of the fourteenth switch K14 are both connected to the ground via the first sub-capacitor Cout1. For example, the fourth terminal of the first pathway 110 is electrically connected to the fourth terminal of the second pathway 120, and the fourth terminal of the first pathway 110 and the fourth terminal of the second pathway 120 are both connected to the ground via the first sub-capacitor Cout1.

The second terminal of the third switch K3 is the fifth terminal of the first pathway 110, and the second terminal of the eleventh switch K11 is the fifth terminal of the first pathway 110. As illustrated in FIG. 2, the second terminal of the third switch K3 is electrically connected to the second terminal of the eleventh switch K11, and the second terminal of the third switch K3 and the second terminal of the eleventh switch K11 are both connected to the ground via the second sub-capacitor Cout2. As such, the fifth terminal of the first pathway 110 is electrically connected to the fifth terminal of the second pathway 120, and the fifth terminal of the first pathway 110 and the fifth terminal of the second pathway 120 are both connected to the ground via the first sub-capacitor Cout1.

In some embodiments, as illustrated in FIG. 2, the connection point between the second terminal of the sixth switch K6 and the second terminal of the fourteenth switch K14 is electrically connected to the first output terminal OUT1.

The second terminal of the sixth switch K6 and the second terminal of the fourteenth switch K14 are both electrically connected to the first output terminal OUT1, and the second terminal of the sixth switch K6 and the second terminal of the fourteenth switch K14 are both connected to the ground via the first sub-capacitor Cout1. As such, the fourth terminal of the first pathway 110 and the fourth terminal of the second pathway 120 are both electrically connected to the first output terminal OUT1 of the switched-capacitor voltage conversion circuit 100, and the first output terminal OUT1 is connected to the ground via the first sub-capacitor Cout1.

By controlling the connections of the first capacitor CF1, the second capacitor CF2, the third capacitor CF3, and the fourth capacitor CF4, in the case that the input voltage $V_{in}$ is input to the input terminal IN of the switched-capacitor voltage conversion circuit 100, the switched-capacitor voltage conversion circuit 100 is configured to convert the input voltage $V_{in}$ to $V_{in}/4$, and output $V_{in}/4$ as the first output voltage $V_{out1}$ via the first output terminal OUT1. As such, based on the four capacitors, the switched-capacitor voltage conversion circuit 100 is capable of implementing a 4:1 bucking function.

According to the embodiments of the present disclosure, the switched-capacitor voltage conversion circuit includes: a first pathway and a second pathway. A first terminal of the first pathway and a first terminal of the second pathway are both electrically connected to an input terminal of the switched-capacitor voltage conversion circuit. The input terminal of the switched-capacitor voltage conversion circuit is connected to an input voltage. A second terminal of the first pathway is electrically connected to a third terminal of the second pathway. A third terminal of the first pathway is electrically connected to a second terminal of the second pathway. A fourth terminal of the first pathway and a fourth terminal of the second pathway are both electrically connected to a first output terminal of the switched-capacitor voltage conversion circuit. A fifth terminal of the first pathway is electrically connected to a fifth terminal of the second pathway. The first pathway includes a first capacitor, a second capacitor, and a first switch assembly. The second pathway includes a third capacitor, a fourth capacitor, and a second switch assembly. Further, a switch assembly includes the first switch assembly and the second switch assembly. The switch assembly is configured to control a connection between any two of the first capacitor, the second capacitor, the third capacitor, and the fourth capacitor. The switched-capacitor voltage conversion circuit is configured to convert the input voltage to a first output voltage, and output the first output voltage via the first output terminal, where the input voltage is four times of the first output voltage. As such, based on the four capacitors, the switched-capacitor voltage conversion circuit implements 4:1 bucking function for the input voltage, and is capable of reducing the number of capacitors, that is, reducing the number of devices and elements in the switched-capacitor voltage conversion circuit. In this way, the area occupied by the switched-capacitor voltage conversion circuit is reduced, and miniaturization of the switched-capacitor voltage conversion circuit is facilitated.

Figure 3A:
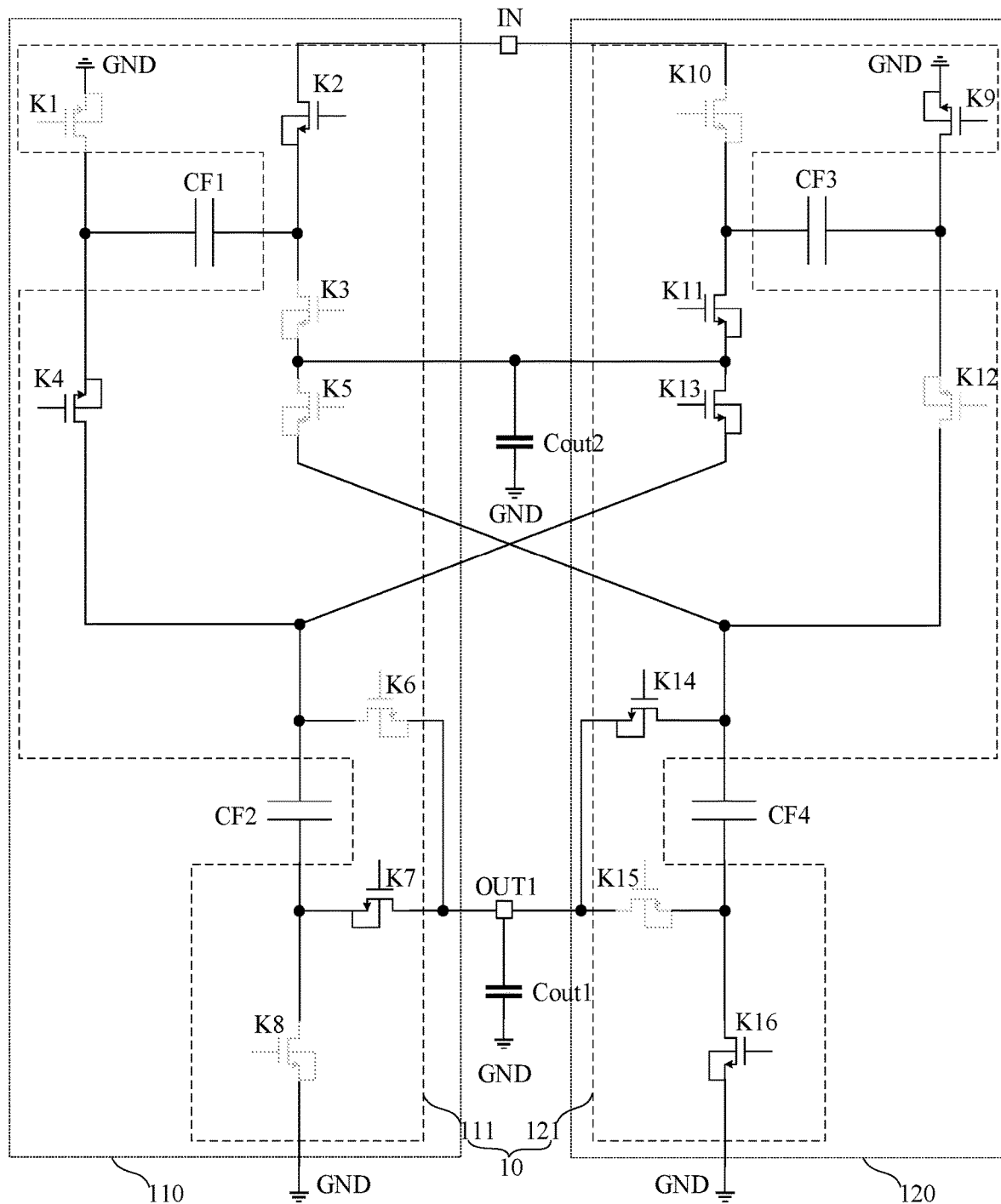
FIG. 3A is a schematic structural diagram of the switched-capacitor voltage conversion circuit in a first state according to an embodiment of the present disclosure.
Figure 3B:
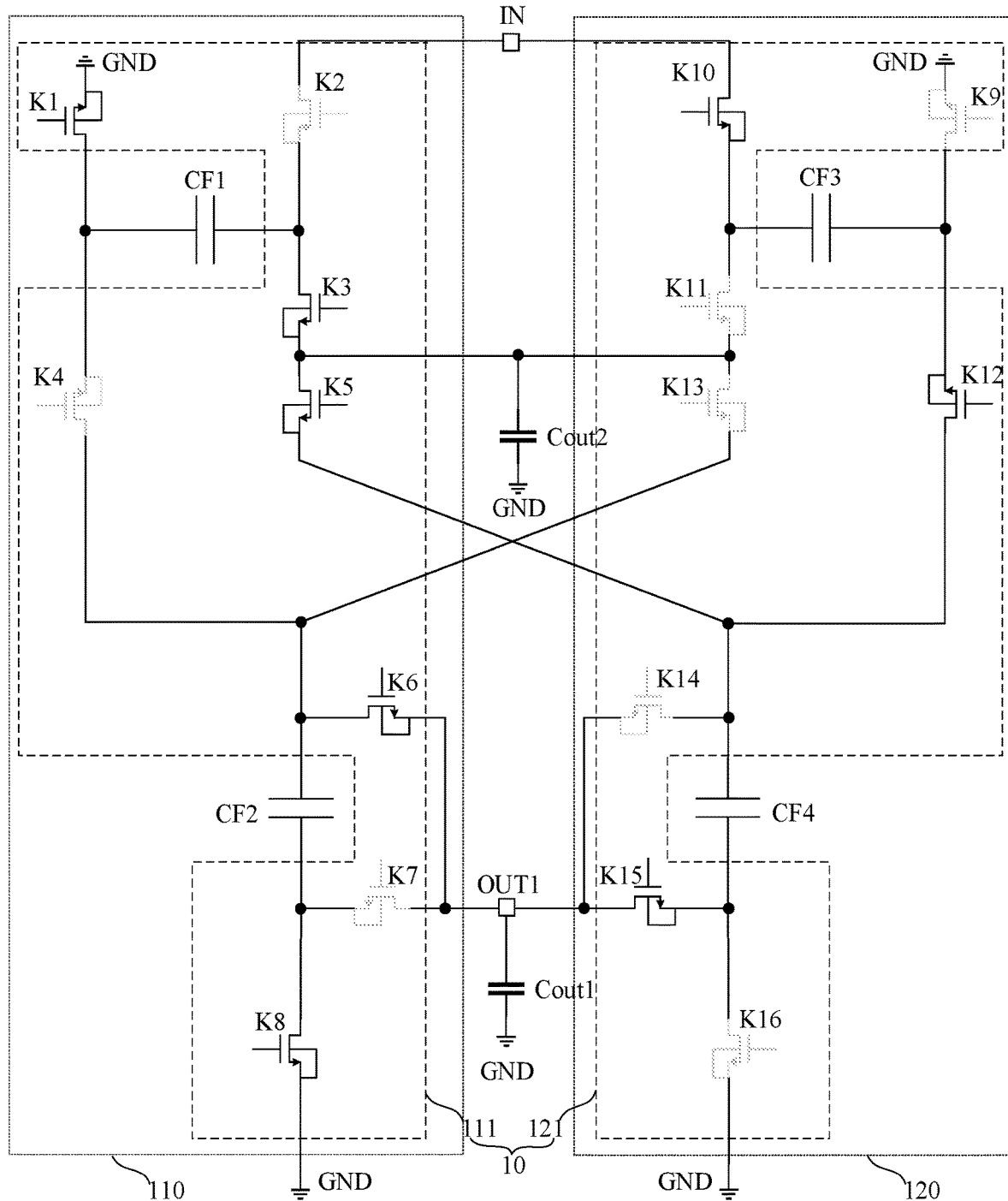
FIG. 3B is a schematic structural diagram of the switched-capacitor voltage conversion circuit in a second state according to an embodiment of the present disclosure.

In some embodiments, FIG. 3A is a schematic structural diagram of a switched-capacitor voltage conversion circuit in a first state according to an embodiment of the present disclosure, and FIG. 3B is a schematic structural diagram of the switched-capacitor voltage conversion circuit in a second state according to an embodiment of the present disclosure. With reference to FIG. 3A and FIG. 3B, the switched-capacitor voltage conversion circuit 100 is configured to convert the input voltage $V_{in}$ to the first output voltage $V_{out1}$ in a first operating mode, and the first operating mode is that the switch assembly 10 operates in the first state or the second state.

In the first state, as illustrated in FIG. 3A, the second switch K2, the fourth switch K4, the seventh switch K7, the ninth switch K9, the eleventh switch K11, the thirteenth switch K13, the fourteenth switch K14, and the sixteenth switch K16 are all turned on, and the first switch K1, the third switch K3, the fifth switch K5, the sixth switch K6, the eighth switch K8, the tenth switch K10, the twelfth switch K12, and the fifteenth switch K15 are all turned off.

In the second state, as illustrated in FIG. 3B, the second switch K2, the fourth switch K4, the seventh switch K7, the ninth switch K9, the eleventh switch K11, the thirteenth switch K13, the fourteenth switch K14, and the sixteenth switch K16 are all turned off, and the first switch K1, the third switch K3, the fifth switch K5, the sixth switch K6, the eighth switch K8, the tenth switch K10, the twelfth switch K12, and the fifteenth switch K15 are all turned on.

Exemplarily, as illustrated in FIG. 3A, the second switch K2 is turned on and the tenth switch K10 is turned off, and in this case, the input voltage $V_{in}$ is conducted with the first plate of the first capacitor CF1, and the input voltage $V_{in}$ is disconnected from the first plate of the third capacitor CF3; and the third switch K3 and the fifth switch K5 are both turned off, and in this case, the first plate of the first capacitor CF1 is disconnected from the first plate of the fourth capacitor CF4. The fourth switch K4 is turned on and the first switch K1 is turned off, and in this case, the second plate of the first capacitor CF1 is conducted with the first plate of the second capacitor CF2, and the second plate of the first capacitor CF1 is disconnected from the ground. In addition, the eleventh switch K11 and the thirteenth switch K13 are both turned on, and in this case, the second plate of the first capacitor CF1 is further conducted with the first plate of the third capacitor CF3. The ninth switch K9 is turned on and the twelfth switch K12 is turned off, and in this case, the second plate of the third capacitor CF3 is conducted with the ground, and the second plate of the third capacitor CF3 is disconnected from the first plate of the fourth capacitor CF4. The seventh switch K7 and the fourteenth switch K14 are both turned on and the fifteenth switch K15 is turned off, and in this case, the second plate of the second capacitor CF2 is conducted with the first plate of the fourth capacitor CF4, and the second plate of the second capacitor CF2 is disconnected from the second plate of the fourth capacitor CF4. The eighth switch K8 is turned off, and in this case, the second plate of the second capacitor CF2 is disconnected from the ground. The sixth switch K6 is turned off, and in this case, the first plate of the second capacitor CF2 is disconnected from the fourth capacitor CF4. The sixteenth switch K16 is turned on, and in this case, the second plate of the fourth capacitor CF4 is conducted with the ground.

As such, the second plate of the second capacitor CF2 and the first plate of the fourth capacitor CF4 are both electrically connected to the first output terminal OUT1. An equivalent circuit diagram of the switched-capacitor voltage conversion circuit 100 in the first state may be illustrated in FIG. 4A. The second capacitor CF2 is connected in series to the fourth capacitor CF4, the second capacitor CF2 and the fourth capacitor CF4 which are connected in series are connected in parallel to the third capacitor CF3, and then a circuit formed by the second capacitor CF2, the fourth capacitor CF4 and the third capacitor CF3 is further connected in series to the first capacitor CF1, and finally a circuit formed by the second capacitor CF2, the fourth capacitor CF4, the third capacitor CF3 and the first capacitor CF1 is connected between the input terminal IN and the first output terminal OUT1 of the switched-capacitor voltage conversion circuit 100. In this case, the output voltage at the first output terminal OUT1 is $V_{in}/4$, that is, the first output voltage $V_{out1}=V_{in}/4$.

As illustrated in FIG. 3B, the tenth switch K10 is turned on and the second switch K2 is turned off, and in this case, the input voltage $V_{in}$ is conducted with the first plate of the third capacitor CF3, and the input voltage $V_{in}$ is disconnected from the first plate of the first capacitor CF1; and the eleventh switch K11 and the thirteenth switch K13 are both turned off, and in this case, the first plate of the third capacitor CF3 is disconnected from the first plate of the second capacitor CF2. The twelfth switch K12 is turned on and the ninth switch K9 is turned off, and in this case, the second plate of the third capacitor CF3 is conducted with the first plate of the fourth capacitor CF4, and the second plate of the third capacitor CF3 is disconnected from the ground. In addition, the third switch K3 and the fifth switch K5 are both turned on, and in this case, the second plate of the third capacitor CF3 is further conducted with the first plate of the first capacitor CF1. The first switch K1 is turned on and the fourth switch K4 is turned off, and in this case, the second plate of the first capacitor CF1 is conducted with the ground, and the second plate of the first capacitor CF1 is disconnected from the first plate of the second capacitor CF2. The sixth switch K6 and the fifteenth switch K15 are both turned on and the seventh switch K7 is turned off, and in this case, the second plate of the fourth capacitor CF4 is conducted with the first plate of the second capacitor CF2, and the second plate of the fourth capacitor CF4 is disconnected from the second plate of the second capacitor CF2. The sixteenth switch K16 is turned off, and in this case, the second plate of the fourth capacitor CF4 is disconnected from the ground. The fourteenth switch K14 is turned off, and in this case, the first plate of the fourth capacitor CF4 is disconnected from the second capacitor CF2. The eighth switch K8 is turned on, and in this case, the second plate of the second capacitor CF2 is conducted with the ground.

As such, the second plate of the fourth capacitor CF4 and the first plate of the second capacitor CF2 are both electrically connected to the first output terminal OUT1 of the switched-capacitor voltage conversion circuit 100. An equivalent circuit diagram of the switched-capacitor voltage conversion circuit 100 in the second state may be illustrated in FIG. 4B. The second capacitor CF2 is connected in series to the fourth capacitor CF4, the second capacitor CF2 and fourth capacitor CF4 which are connected in series are connected in parallel to the first capacitor CF1, and then a circuit formed by the second capacitor CF2, the fourth capacitor CF4 and the first capacitor CF1 is further connected in series to the third capacitor CF3, and finally a circuit formed by the second capacitor CF2, the fourth capacitor CF4, the first capacitor CF1 and the third capacitor CF3 is connected between the input terminal IN and the first output terminal OUT1 of the switched-capacitor voltage conversion circuit 100. In this case, the output voltage at the first output terminal OUT1 is still the first output voltage $V_{out1}$.

In the first operating mode, the switch assembly 10 is switched between the first state and the second state, such that the first output terminal OUT1 of the switched-capacitor voltage conversion circuit 100 constantly outputs the first output voltage $V_{out1}$. In this way, stable output of the first output voltage $V_{out1}$ is maintained, and stability of the output voltage of the switched-capacitor voltage conversion circuit 100 is ensured.

In the embodiments of the present disclosure, in the first operating mode, the switched-capacitor voltage conversion circuit 100 is configured to convert the input voltage to the first output voltage, and the first operating mode is that the switch assembly operates in the first state or the second state. In the first state, the second switch, the fourth switch, the seventh switch, the ninth switch, the eleventh switch, the thirteenth switch, the fourteenth switch, and the sixteenth switch are all turned on, and the first switch, the third switch, the fifth switch, the sixth switch, the eighth switch, the tenth switch, the twelfth switch, and the fifteenth switch are all turned off. In the second state, the second switch, the fourth switch, the seventh switch, the ninth switch, the eleventh switch, the thirteenth switch, the fourteenth switch, and the sixteenth switch are all turned off, and the first switch, the third switch, the fifth switch, the sixth switch, the eighth switch, the tenth switch, the twelfth switch, and the fifteenth switch are all turned on. In this way, stable output of the first output voltage is maintained, and stability of the output voltage of the switched-capacitor voltage conversion circuit 100 is ensured.

Figure 5A:
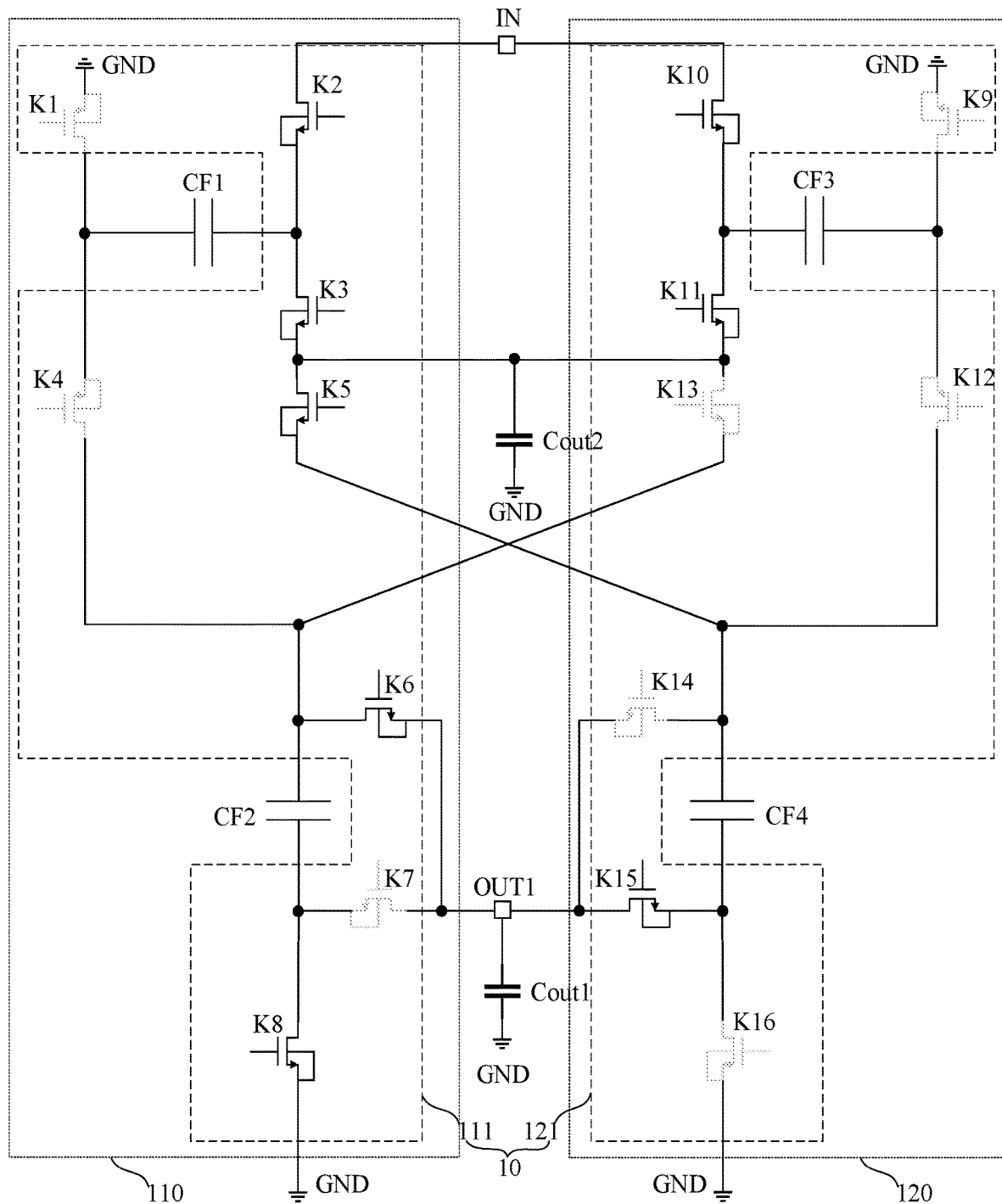
FIG. 5A is a schematic structural diagram of the switched-capacitor voltage conversion circuit in a third state according to an embodiment of the present disclosure.
Figure 5B:
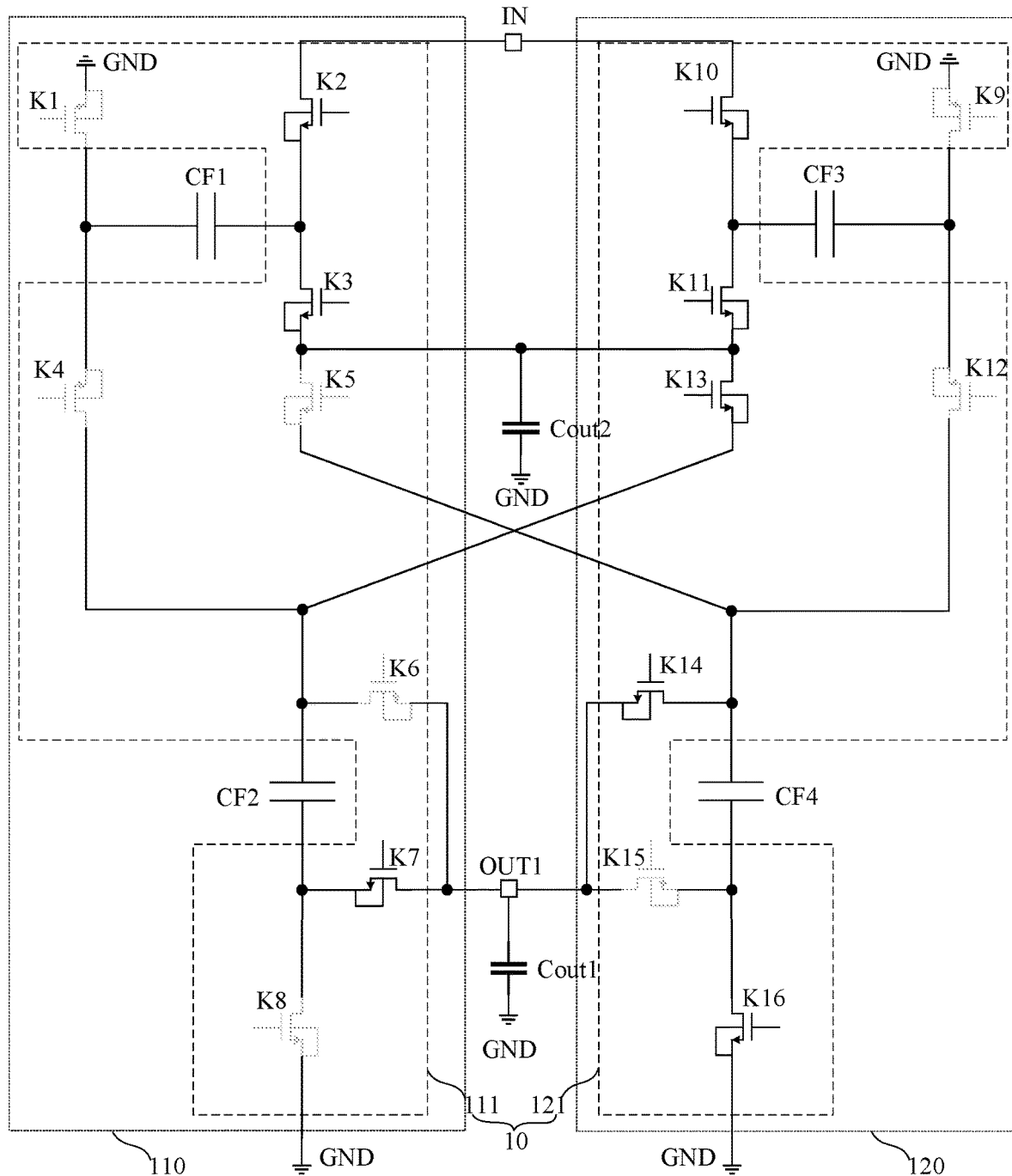
FIG. 5B is a schematic structural diagram of the switched-capacitor voltage conversion circuit in a fourth state according to an embodiment of the present disclosure.

Based on the above embodiments, FIG. 5A is a schematic structural diagram of the switched-capacitor voltage conversion circuit in a third state according to an embodiment of the present disclosure, and FIG. 5B is a schematic structural diagram of the switched-capacitor voltage conversion circuit in a fourth state according to an embodiment of the present disclosure. With reference to FIG. 5A and FIG. 5B, the switched-capacitor voltage conversion circuit 100 is configured to convert the input voltage $V_{in}$ to a second output voltage $V_{out2}$ in a second operating mode and output the second output voltage $V_{out2}$ via the first output terminal OUT1, and the second operating mode is that the switch assembly 10 operates in a third state or a fourth state.

In the third state, as illustrated in FIG. 5A, the second switch K2, the third switch K3, the fifth switch K5, the sixth switch K6, the eighth switch K8, the tenth switch K10, the eleventh switch K11, and the fifteenth switch K15 are all turned on, and the first switch K1, the fourth switch K4, the seventh switch K7, the ninth switch K9, the twelfth switch K12, the thirteenth switch K13, the fourteenth switch K14, and the sixteenth switch K16 are all turned off.

In the fourth state, as illustrated in FIG. 5B, the second switch K2, the third switch K3, the seventh switch K7, the tenth switch K10, the eleventh switch K11, the thirteenth switch K13, the fourteenth switch K14, and the sixteenth switch K16 are all turned on, and the first switch K1, the fourth switch K4, the fifth switch K5, the sixth switch K6, the eighth switch K8, the ninth switch K9, the twelfth switch K12, and the fifteenth switch K15 are all turned off.

Exemplarily, as illustrated in FIG. 5A, the second switch K2 is turned on and the first switch K1 and the fourth switch K4 are both turned off, and in this case, the first capacitor CF1 is not connected to the switched-capacitor voltage conversion circuit 100. In addition, the third switch K3 and the fifth switch K5 are both turned on, and in this case, the input voltage $V_{in}$ is conducted with the first plate of the fourth capacitor CF4. The tenth switch K10 is turned on and the ninth switch K9 and the twelfth switch K12 are both turned off, and in this case, the third capacitor CF3 is not connected to the switched-capacitor voltage conversion circuit 100. In addition, the thirteenth switch K13 is turned off, and in this case, the input voltage $V_{in}$ is disconnected from the first plate of the second capacitor CF2. The fifteenth switch K15 and the sixth switch K6 are both turned on and the seventh switch K7 is turned off, and in this case, the second plate of the fourth capacitor CF4 is conducted with the first plate of the second capacitor CF2, and the second plate of the fourth capacitor CF4 is disconnected from the second plate of the second capacitor CF2. The fourteenth switch K14 is turned off, and in this case, the first plate of the fourth capacitor CF4 is disconnected from the second capacitor CF2. The eighth switch K8 is turned on, and in this case, the second plate of the second capacitor CF2 is conducted with the ground. The sixteenth switch K16 is turned off, and in this case, the second plate of the fourth capacitor CF4 is disconnected from the ground.

Figure 6A:
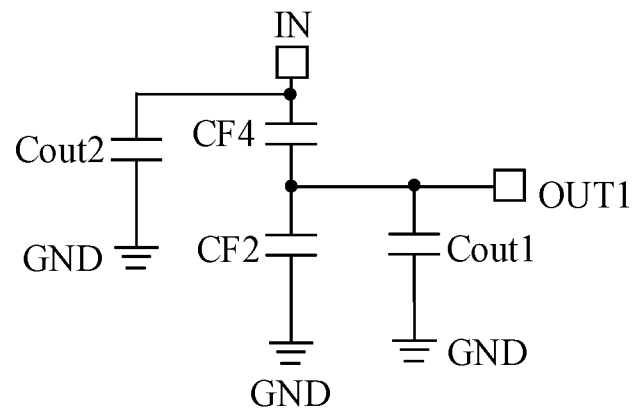
FIG. 6A is a schematic diagram of an equivalent circuit of the switched-capacitor voltage conversion circuit as illustrated in FIG. 5A.

As such, the second plate of the fourth capacitor CF4 and the first plate of the second capacitor CF2 are both electrically connected to the first output terminal OUT1 of the switched-capacitor voltage conversion circuit 100. An equivalent circuit diagram of the switched-capacitor voltage conversion circuit 100 in the third state may be as illustrated in FIG. 6A. The second capacitor CF2 is connected in series to the fourth capacitor CF4, and the second capacitor CF2 and fourth capacitor CF4 which are connected in series are connected between the input terminal IN and the first output terminal OUT of the switched-capacitor voltage conversion circuit 100. In this case, the output voltage at the first output terminal OUT1 is $V_{in}/2$, that is, the second output voltage $V_{out2}=V_{in}/2$.

As illustrated in FIG. 5B, the tenth switch K10 is turned on and the ninth switch K9 and the twelfth switch K12 are both turned off, and in this case, the third capacitor CF3 is not connected to the switched-capacitor voltage conversion circuit 100. In addition, the eleventh switch K11 and the thirteenth switch K13 are both turned on, and in this case, the input voltage $V_{in}$ is conducted with the first plate of the second capacitor CF2. The second switch K2 is turned on and the first switch K1 and the fourth switch K4 are both turned off, and in this case, the first capacitor CF1 is not connected to the switched-capacitor voltage conversion circuit 100. In addition, the fifth switch K5 is turned off, and in this case, the input voltage $V_{in}$ is disconnected from the first plate of the fourth capacitor CF4. The seventh switch K7 and the fourteenth switch K14 are both turned on and the fifteenth switch K15 is turned off, and in this case, the second plate of the second capacitor CF2 is conducted with the first plate of the fourth capacitor CF4, and the second plate of the second capacitor CF2 is disconnected from the second plate of the fourth capacitor CF4. The sixth switch K6 is turned off, and in this case, the first plate of the second capacitor CF2 is disconnected from the fourth capacitor CF4. The sixteenth switch K16 is turned on, and in this case, the second plate of the fourth capacitor CF4 is conducted with the ground. The eighth switch K8 is turned off, and in this case, the second plate of the second capacitor CF2 is disconnected from the ground.

Figure 6B:
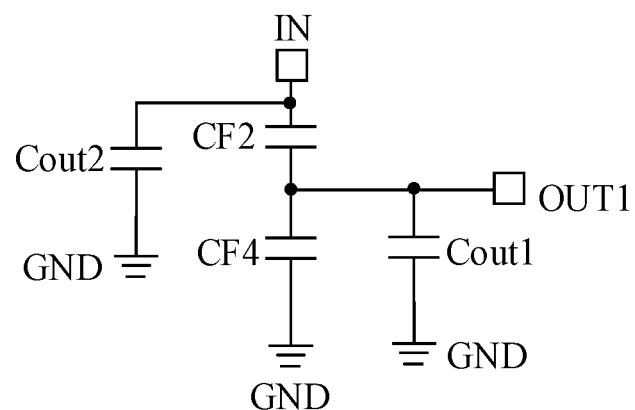
FIG. 6B is a schematic diagram of an equivalent circuit of the switched-capacitor voltage conversion circuit as illustrated in FIG. 5B.

As such, the second plate of the second capacitor CF2 and the first plate of the fourth capacitor CF4 are both electrically connected to the first output terminal OUT1 of the switched-capacitor voltage conversion circuit 100. An equivalent circuit diagram of the switched-capacitor voltage conversion circuit 100 in the second state may be as illustrated in FIG. 6B. The second capacitor CF2 is connected in series to the fourth capacitor CF4, and the second capacitor CF2 and fourth capacitor CF4 which are connected in series are connected between the input terminal IN and the first output terminal OUT1 of the switched-capacitor voltage conversion circuit 100. In this case, the output voltage at the first output terminal OUT1 is still the second output voltage $V_{out2}$.

In the second operating mode, the switch assembly 10 is switched between the third state and the fourth state, such that the first output terminal OUT1 of the switched-capacitor voltage conversion circuit 100 constantly outputs the second output voltage $V_{out2}$. In this way, stable output of the second output voltage $V_{out2}$ is maintained, and stability of the output voltage of the switched-capacitor voltage conversion circuit 100 is ensured.

In the embodiments of the present disclosure, in the second operating mode, the switched-capacitor voltage conversion circuit is configured to convert the input voltage to the second output voltage and output the second output voltage via the first output terminal, and the second operating mode is that the switch assembly operates in the third state or the fourth state. In the third state, the second switch, the fourth switch, the seventh switch, the ninth switch, the eleventh switch, the thirteenth switch, the fourteenth switch, and the sixteenth switch are all turned on, and the first switch, the third switch, the fifth switch, the sixth switch, the eighth switch, the tenth switch, the twelfth switch, and the fifteenth switch are all turned off. In the fourth state, the second switch, the fourth switch, the seventh switch, the ninth switch, the eleventh switch, the thirteenth switch, the fourteenth switch, and the sixteenth switch are all turned off, and the first switch, the third switch, the fifth switch, the sixth switch, the eighth switch, the tenth switch, the twelfth switch, and the fifteenth switch are all turned on. As such, the switched-capacitor voltage conversion circuit 100 is configured to output different voltages in different operating modes respectively, such that the switched-capacitor voltage conversion circuit 100 is applicable to different scenarios, and applicability of the switched-capacitor voltage conversion circuit 100 is enhanced.

Figure 7:
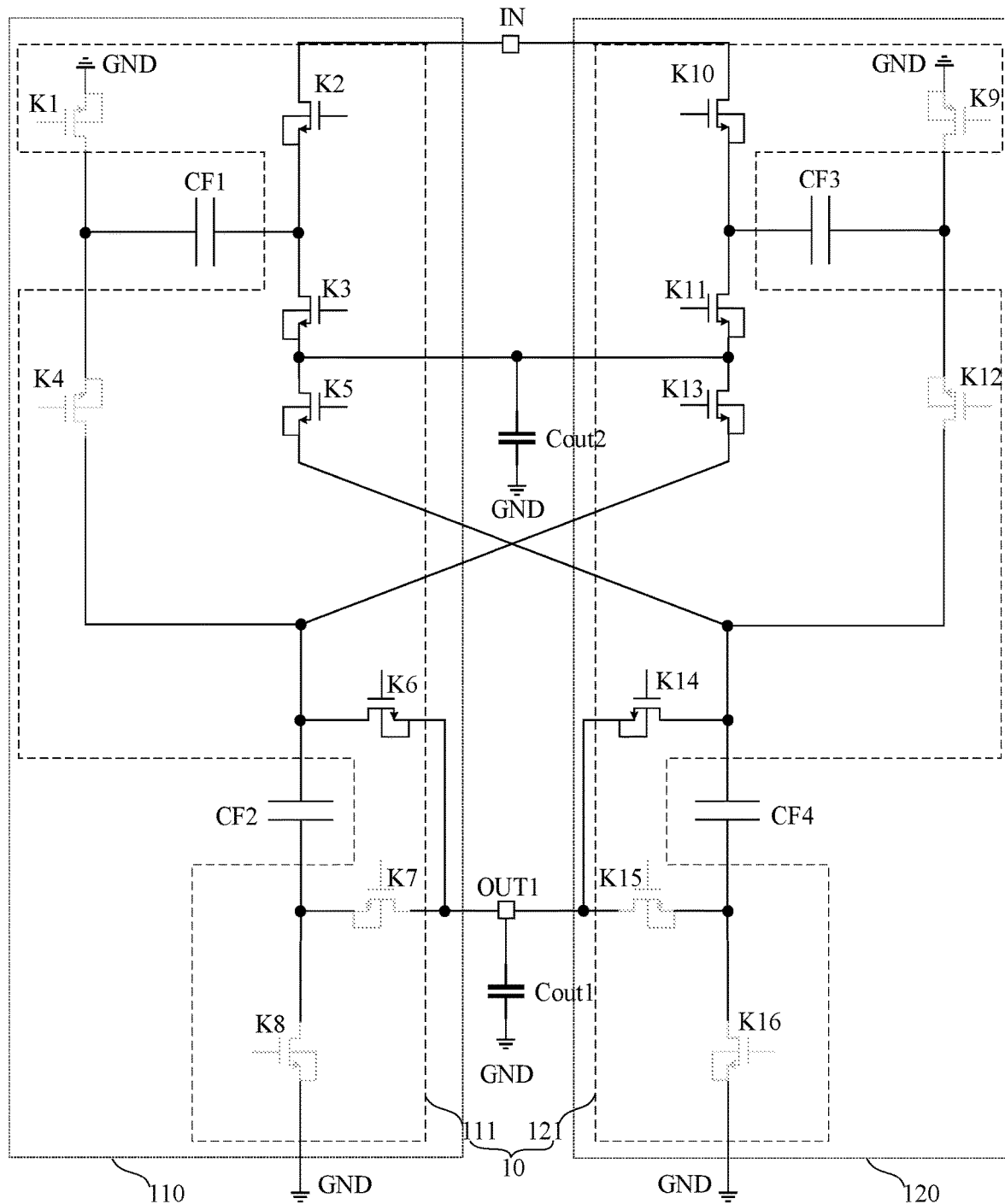
FIG. 7 is a schematic structural diagram of the switched-capacitor voltage conversion circuit in a third operating mode according to an embodiment of the present disclosure.

Based on the above embodiments, FIG. 7 is a schematic structural diagram of the switched-capacitor voltage conversion circuit in a third operating mode according to an embodiment of the present disclosure. As illustrated in FIG. 7, the switched-capacitor voltage conversion circuit 100 is configured to convert the input voltage $V_{in}$ to a third output voltage $V_{out3}$ in the third operating mode and output the third output voltage $V_{out3}$ via the first output terminal OUT1 of the switched-capacitor voltage conversion circuit 100.

In the third operating mode, the second switch K2, the third switch K3, the fifth switch K5, the sixth switch K6, the tenth switch K10, the eleventh switch K11, the thirteenth switch K13, and the fourteenth switch K14 are all turned on, and the first switch K1, the fourth switch K4, the seventh switch K7, the eighth switch K8, the ninth switch K9, the twelfth switch K12, the fifteenth switch K15, and the sixteenth switch K16 are all turned off.

Exemplarily, as illustrated in FIG. 7, the first switch K1 and the fourth switch K4 are both turned off, and in this case, the first capacitor CF1 is not connected to the switched-capacitor voltage conversion circuit 100; the ninth switch K9 and the twelfth switch K12 are both turned off, and in this case, the third capacitor CF3 is not connected to the switched-capacitor voltage conversion circuit 100; the seventh switch K7 and the eighth switch K8 are both turned off, and in this case, the second capacitor CF2 is not connected to the switched-capacitor voltage conversion circuit 100; and the fifteenth switch K15 and the sixteenth switch K16 are both turned off, and in this case, the fourth capacitor CF4 is not connected to the switched-capacitor voltage conversion circuit 100. The second switch K2, the third switch K3, the fifth switch K5, and the fourteenth switch K14 are all turned on, and the input voltage $V_{in}$ may be conducted with the first output terminal OUT1 via the second switch K2, the third switch K3, the fifth switch K5, and the fourteenth switch K14. The tenth switch K10, the eleventh switch K11, the thirteenth switch K13, and the sixth switch K6 are all turned on, and the input voltage $V_{in}$ may also be conducted with the first output terminal OUT1 via the tenth switch K10, the eleventh switch K11, the thirteenth switch K13, and the sixth switch K6. In this case, the output voltage at the first output terminal OUT1 is $V_{in}$, that is, the third output voltage $V_{out3}=V_{in}$.

In the embodiments of the present disclosure, in the third operating mode, the switched-capacitor voltage conversion circuit is configured to convert the input voltage to the third output voltage and output the third output voltage via the first output terminal. In the third operating mode, the second switch, the third switch, the fifth switch, the sixth switch, the tenth switch, the eleventh switch, the thirteenth switch, and the fourteenth switch are all turned on, and the first switch, the fourth switch, the seventh switch, the eighth switch, the ninth switch, the twelfth switch, the fifteenth switch, and the sixteenth switch are all turned off. As such, the switched-capacitor voltage conversion circuit 100 is configured to output different voltages in different operating modes respectively, such that the switched-capacitor voltage conversion circuit 100 is applicable to different scenarios, and applicability of the switched-capacitor voltage conversion circuit 100 is enhanced.

Figure 8:
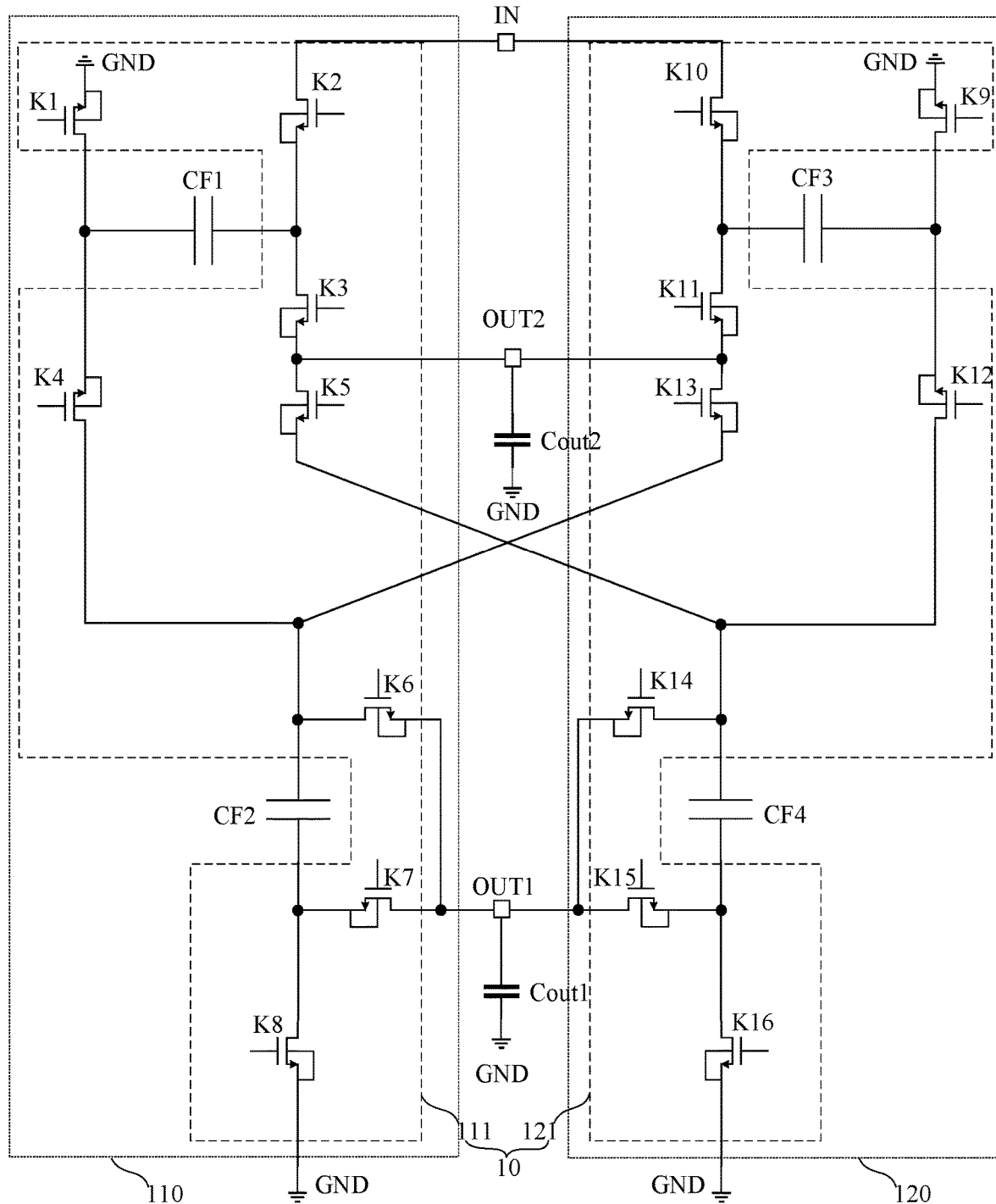
FIG. 8 is a schematic structural diagram of another switched-capacitor voltage conversion circuit according to an embodiment of the present disclosure.

In some embodiments, FIG. 8 is a schematic structural diagram of another switched-capacitor voltage conversion circuit according to an embodiment of the present disclosure. As illustrated in FIG. 8, based on the embodiment as illustrated in FIG. 2, a connection point between the second terminal of the third switch K3 and the second terminal of the eleventh switch K11 is electrically connected to a second output terminal OUT2 of the switched-capacitor voltage conversion circuit 100.

The second terminal of the third switch K3 and the second terminal of the eleventh switch K11 are both electrically connected to the second output terminal OUT2 of the switched-capacitor voltage conversion circuit 100, and the second terminal of the third switch K3 and the second terminal of the eleventh switch K11 are both connected to the ground via the second sub-capacitor Cout2. As such, the fifth terminal of the first pathway 110 and the fifth terminal of the second pathway 120 are both electrically connected to the second output terminal OUT2 of the switched-capacitor voltage conversion circuit 100, and the second output terminal OUT2 is connected to the ground via the second sub-capacitor Cout2.

Exemplarily, the switched-capacitor voltage conversion circuit 100 is further configured to, in the first operating mode, convert the input voltage $V_{in}$ to a fourth output voltage $V_{out4}$, and output the fourth output voltage $V_{out4}$ via the second output terminal OUT2.

Figure 4A:
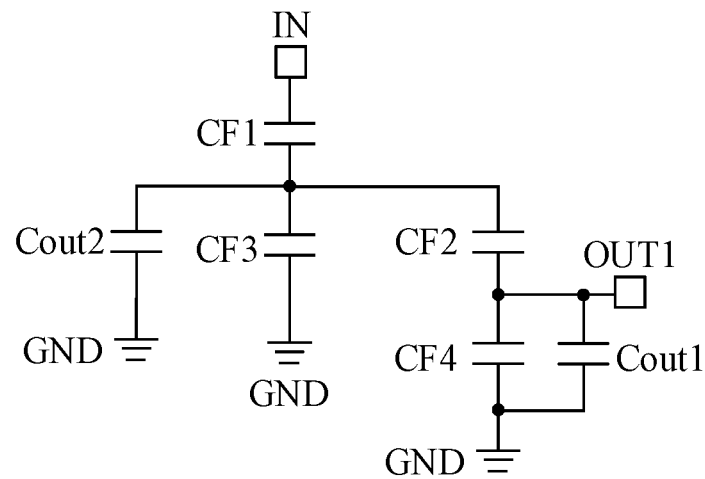
FIG. 4A is a schematic diagram of an equivalent circuit of the switched-capacitor voltage conversion circuit as illustrated in FIG. 3A.

In the first state, the third switch K3 is turned off, the eleventh switch K11, the thirteenth switch K13, and the fourth switch K4 are all turned on, and the second plate of the first capacitor CF1 is conducted with the first plate of the third capacitor CF3 via the fourth switch K4, the thirteenth switch K13, and the eleventh switch K11. As such, the second plate of the first capacitor CF1 and the first plate of the third capacitor CF3 serve as the second output terminal OUT2. That is, as illustrated in FIG. 4A, the connection point between the first capacitor CF1 and the third capacitor CF3 is the second output terminal OUT2. In this case, the output voltage at the second output terminal OUT2 is $V_{in}/2$, that is, the fourth output voltage $V_{out4}=V_{in}/2$.

Figure 4B:
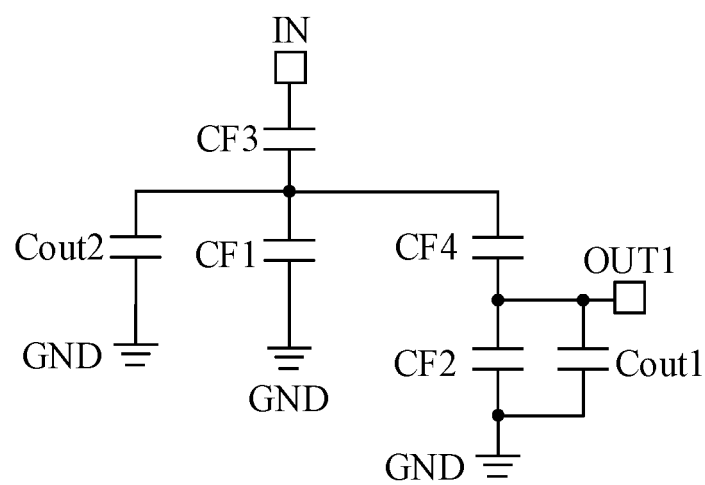
FIG. 4B is a schematic diagram of an equivalent circuit of the switched-capacitor voltage conversion circuit as illustrated in FIG. 3B.

In the second state, the eleventh switch K11 is turned off, the third switch K3, the fifth switch K5, and the twelfth switch K12 are all turned on, and the second plate of the third capacitor CF3 is conducted with the first plate of the first capacitor CF1 via the twelfth switch K12, the fifth switch K5, and the third switch K3. As such, the first plate of the first capacitor CF1 and the second plate of the third capacitor CF3 serve as the second output terminal OUT2. That is, the connection point between the first capacitor CF1 and the third capacitor CF3 as illustrated in FIG. 4B is the second output terminal OUT2. In this case, the output voltage at the second output terminal OUT2 is still the fourth output voltage $V_{out4}$.

Exemplarily, the switched-capacitor voltage conversion circuit 100 is further configured to, in the second operating mode, convert the input voltage $V_{in}$ to a fifth output voltage $V_{out5}$, and output the fifth output voltage $V_{out5}$ via the second output terminal OUT2.

In the third state, neither the first capacitor CF1 nor the third capacitor CF3 is connected to the switched-capacitor voltage conversion circuit 100, the second switch K2, the third switch K3, and the fifth switch K5 are all turned on, the thirteenth switch K13 is turned off, and the input voltage $V_{in}$ is conducted with the first plate of the fourth capacitor CF4 via the second switch K2, the third switch K3, and the fifth switch K5. As such, the first plate of the fourth capacitor CF4 is electrically connected to the second output terminal OUT2. It is apparent that the output voltage at the second output terminal OUT2 is $V_{in}$, that is, the fifth output voltage $V_{out5}=V_{in}$.

In the fourth state, neither the first capacitor CF1 nor the third capacitor CF3 is connected to the switched-capacitor voltage conversion circuit 100, the tenth switch K10, the eleventh switch K11, and the thirteenth switch K13 are all turned on, the fifth switch K5 is turned off, and the input voltage $V_{in}$ is conducted with the first plate of the second capacitor CF2 via the tenth switch K10, the eleventh switch K11, and the thirteenth switch K13. As such, the first plate of the second capacitor CF2 is electrically connected to the second output terminal OUT2. It is apparent that the output voltage at the second output terminal OUT2 is still the fifth output voltage $V_{out5}$.

Exemplarily, the switched-capacitor voltage conversion circuit 100 is further configured to, in the third operating mode, convert the input voltage $V_{in}$ to a sixth output voltage $V_{out6}$, and output the sixth output voltage Vouto via the second output terminal OUT2.

In the third operating mode, none of the first capacitor CF1, the second capacitor CF2, the third capacitor CF3, and the fourth capacitor CF4 is connected to the switched-capacitor voltage conversion circuit 100, the second switch K2, the third switch K3, the fifth switch K5, and the fourteenth switch K14 are all turned on, and the input voltage $V_{in}$ is conducted with the first output terminal OUT1 via the second switch K2, the third switch K3, the fifth switch K5, and the fourteenth switch K14. The tenth switch K10, the eleventh switch K11, the thirteenth switch K13, and the sixth switch K6 are all turned on, and the input voltage $V_{in}$ is further conducted with the first output terminal OUT1 via the tenth switch K10, the eleventh switch K11, the thirteenth switch K13, and the sixth switch K6.

As such, the output voltage at the second output terminal OUT2 and the output voltage at the first output terminal OUT1 are both equal to the input voltage $V_{in}$, that is, the sixth output voltage $V_{out6}=V_{out3}=V_{in}$.

In the embodiments of the present disclosure, the second terminal of the third switch K3 and the second terminal of the eleventh switch K11 are both electrically connected to the second output terminal of the switched-capacitor voltage conversion circuit 100. As such, a plurality of output terminals may be arranged in the switched-capacitor voltage conversion circuit 100, such that the switched-capacitor voltage conversion circuit 100 is capable of simultaneously outputting a plurality of voltages.

Based on the above embodiments, in the first operating mode, with reference to FIG. 4A and FIG. 4B, maximum voltages sustainable by the first capacitor CF1 and the third capacitor CF3 are both $2*V_{out1}=V_{in}/2$, and maximum voltages sustainable by the second capacitor CF2 and the fourth capacitor CF4 are both $V_{out1}$. In the second operating mode, with reference to FIG. 6A and FIG. 6B, maximum voltages sustainable by the second capacitor CF2 and the fourth capacitor CF4 are both $V_{out2}=V_{in}/2$. As such, maximum voltages sustainable by all the capacitors in the switched-capacitor voltage conversion circuit 100 are all $V_{in}/2$.

In the related art, as illustrated in FIG. 1, maximum voltages sustainable by the capacitors in a Dickson switched-capacitor voltage conversion circuit are all $3*V_{out}$, that is, $3*V_{in}/4$. As such, the capacitors in the switched-capacitor voltage conversion circuit 100 according to the present disclosure are capable of sustaining a small voltage. Therefore, capacitors with a smaller withstand voltage may be selected as the first capacitor CF1, the second capacitor CF2, the third capacitor CF3, and the fourth capacitor CF4 in the switched-capacitor voltage conversion circuit 100. Since the area of a capacitor having a small withstand voltage is small, the areas of the first capacitor CF1, the second capacitor CF2, the third capacitor CF3, and the fourth capacitor CF4 are all small. In this way, the area occupied by the capacitors in the switched-capacitor voltage conversion circuit 100 is reduced, and thus the area occupied by the switched-capacitor voltage conversion circuit 100 is further reduced, which is conducive to miniaturization of the switched-capacitor voltage conversion circuit.

An embodiment of the present disclosure further provides a voltage converter. The voltage converter includes the switched-capacitor voltage conversion circuit 100 according to any one of the above embodiments.

The voltage converter according to the embodiments of the present disclosure may be a charger or a transformer, or may be any other devices capable of implementing voltage conversion, which is not limited in the embodiments of the present disclosure.

The voltage converter according to the embodiments of the present disclosure includes the switched-capacitor voltage conversion circuit 100 according to any of the above embodiments, and has the same functional modules and achieves the same beneficial effects as the switched-capacitor voltage conversion circuit 100, which are thus not described herein any further.

An embodiment of the present disclosure further provides a chip. The chip includes the switched-capacitor voltage conversion circuit 100 according to any one of the above embodiments.

Exemplarily, the switched-capacitor voltage conversion circuit 100 according to any one of the above embodiments is integrated in the chip, such that the volume of the switched-capacitor voltage conversion circuit 100 is reduced, and miniaturization of the switched-capacitor voltage conversion circuit 100 is facilitated.

The chip according to the embodiments of the present disclosure includes the switched-capacitor voltage conversion circuit 100 according to any of the above embodiments, and has the same functional modules and achieves the same beneficial effects as the switched-capacitor voltage conversion circuit 100, which are thus not described herein any further.

Described above are merely specific embodiments of the present disclosure. However, the embodiments of the present disclosure are not limited to those specific ones, and any variations derived by any person skilled in the art would fall within the protection scope of the present disclosure.

In the description of the present disclosure, the word "comprise" or "include" does not exclude the presence of an element or a step not listed in claims. The article "a" or "an" used before an element does not exclude the presence of a plurality of such elements. The present disclosure may be implemented by means of a hardware including several distinct elements and by means of a suitably programmed computer. In a unit claim enumerating several devices, several of the devices may be embodied by one and the same hardware item. Use of the words "first," "second," "third," and the like does not mean any ordering, and may be interpreted as parts of naming. The steps in the above embodiments, unless otherwise specified, shall not be understood as causing limitations to the execution order.

In summary, it should be finally noted that the above-described embodiments are merely for illustration of the present disclosure, but are not intended to limit the present disclosure. Although the present disclosure is described in detail with reference to these embodiments, a person skilled in the art may also make various modifications to the technical solutions disclosed in the embodiments, or make equivalent replacements to a part of the technical features contained therein. Such modifications or replacements, made without departing from the principles of the present disclosure, shall fall within the scope of the present disclosure.

What is claimed is:

1. A switched-capacitor voltage conversion circuit, comprising: a first pathway and a second pathway; wherein a first terminal of the first pathway and a first terminal of the second pathway are both electrically connected to an input terminal of the switched-capacitor voltage conversion circuit, the input terminal of the switched-capacitor voltage conversion circuit is connected to an input voltage, a second terminal of the first pathway is electrically connected to a third terminal of the second pathway, a third terminal of the first pathway is electrically connected to a second terminal of the second pathway, a fourth terminal of the first pathway and a fourth terminal of the second pathway are both electrically connected to a first output terminal of the switched-capacitor voltage conversion circuit, and a fifth terminal of the first pathway is electrically connected to a fifth terminal of the second pathway;

the first pathway comprises a first capacitor, a second capacitor, and a first switch assembly, and the second pathway comprises a third capacitor, a fourth capacitor, and a second switch assembly, a switch assembly comprising the first switch assembly and the second switch assembly;

the switch assembly is configured to control a connection between any two of the first capacitor, the second capacitor, the third capacitor, and the fourth capacitor so that the second capacitor is connected in series to the fourth capacitor, the second capacitor and the fourth capacitor which are connected in series are connected in parallel to the third capacitor, and then a circuit formed by the second capacitor, the fourth capacitor and the third capacitor is further connected in series to the first capacitor, and finally a circuit formed by the second capacitor, the fourth capacitor, the third capacitor and the first capacitor is connected between the input terminal and the first output terminal of the switched-capacitor voltage conversion circuit, or so that the second capacitor is connected in series to the fourth capacitor, the second capacitor and fourth capacitor which are connected in series are connected in parallel to the first capacitor, and then a circuit formed by the second capacitor, the fourth capacitor and the first capacitor is further connected in series to the third capacitor, and finally a circuit formed by the second capacitor, the fourth capacitor, the first capacitor and the third capacitor is connected between the input terminal and the first output terminal of the switched-capacitor voltage conversion circuit; and the switched-capacitor voltage conversion circuit is configured to convert the input voltage to a first output voltage, and output the first output voltage via the first output terminal of the switched-capacitor voltage conversion circuit, wherein the input voltage is four times of the first output voltage.

2. The switched-capacitor voltage conversion circuit according to claim 1, wherein the first switch assembly comprises a first switch, a second switch, a third switch, a fourth switch, a fifth switch, a sixth switch, a seventh switch, and an eighth switch; and the second switch assembly comprises a ninth switch, a tenth switch, an eleventh switch, a twelfth switch, a thirteenth switch, a fourteenth switch, a fifteenth switch, and a sixteenth switch; wherein the input terminal of the switched-capacitor voltage conversion circuit is electrically connected to a first terminal of the third switch and a first plate of the first capacitor via the second switch, and the input terminal of the switched-capacitor voltage conversion circuit is further electrically connected to a first terminal of the eleventh switch and a first plate of the third capacitor via the tenth switch; a second terminal of the third switch is electrically connected to a first terminal of the fifth switch, a second terminal of the fifth switch is electrically connected to a first terminal of the twelfth switch, a first terminal of the fourteenth switch, and a first plate of the fourth capacitor, a second terminal of the eleventh switch is electrically connected to a first terminal of the thirteenth switch, and a second terminal of the thirteenth switch is electrically connected to a first terminal of the fourth switch, a first terminal of the sixth switch, and a first plate of the second capacitor; and a connection point between the second terminal of the third switch and the second terminal of the eleventh switch is connected to a ground via a second sub-capacitor;

a second terminal of the fourth switch is electrically connected to a second plate of the first capacitor and a first terminal of the first switch, and a second terminal of the first switch is connected to the ground; and a second terminal of the twelfth switch is electrically connected to a second plate of the third capacitor and a first terminal of the ninth switch, and a second terminal of the ninth switch is connected to the ground; and a second plate of the second capacitor is electrically connected to a second terminal of the sixth switch via the seventh switch, and the second plate of the second capacitor is further connected to the ground via the eighth switch; a second plate of the fourth capacitor is electrically connected to a second terminal of the fourteenth switch via the fifteenth switch, and the second plate of the fourth capacitor is further connected to the ground via the sixteenth switch; and a connection point between the second terminal of the sixth switch and the second terminal of the fourteenth switch is connected to the ground via a first sub-capacitor.

3. The switched-capacitor voltage conversion circuit according to claim 2, wherein the connection point between the second terminal of the sixth switch and the second terminal of the fourteenth switch is electrically connected to the first output terminal of the switched-capacitor voltage conversion circuit.

4. The switched-capacitor voltage conversion circuit according to claim 2, wherein the switched-capacitor voltage conversion circuit is configured to, in a first operating mode, convert the input voltage to the first output voltage, wherein the first operating mode is that the switch assembly operates in a first state or a second state;

wherein in the first state, the second switch, the fourth switch, the seventh switch, the ninth switch, the eleventh switch, the thirteenth switch, the fourteenth switch, and the sixteenth switch are all turned on, and the first switch, the third switch, the fifth switch, the sixth switch, the eighth switch, the tenth switch, the twelfth switch, and the fifteenth switch are all turned off; and wherein in the second state, the second switch, the fourth switch, the seventh switch, the ninth switch, the eleventh switch, the thirteenth switch, the fourteenth switch, and the sixteenth switch are all turned off, and the first switch, the third switch, the fifth switch, the sixth switch, the eighth switch, the tenth switch, the twelfth switch, and the fifteenth switch are all turned on.

5. The switched-capacitor voltage conversion circuit according to claim 2, wherein the switched-capacitor voltage conversion circuit is further configured to, in a second operating mode, convert the input voltage of the switched-capacitor voltage conversion circuit to a second output voltage, and output the second output voltage via the first output terminal, wherein the second operating mode is that the switch assembly operates in a third state or a fourth state;

wherein in the third state, the second switch, the third switch, the fifth switch, the sixth switch, the eighth switch, the tenth switch, the eleventh switch, and the fifteenth switch are all turned on, and the first switch, the fourth switch, the seventh switch, the ninth switch, the twelfth switch, the thirteenth switch, the fourteenth switch, and the sixteenth switch are all turned off; and wherein in the fourth state, the second switch, the third switch, the seventh switch, the tenth switch, the eleventh switch, the thirteenth switch, the fourteenth switch, and the sixteenth switch are all turned on, and the first switch, the fourth switch, the fifth switch, the sixth switch, the eighth switch, the ninth switch, the twelfth switch, and the fifteenth switch are all turned off.

6. The switched-capacitor voltage conversion circuit according to claim 2, wherein the switched-capacitor voltage conversion circuit is further configured to, in a third operating mode, convert the input voltage of the switched-capacitor voltage conversion circuit to a third output voltage, and output the third output voltage via the first output terminal;

wherein in the third operating mode, the second switch, the third switch, the fifth switch, the sixth switch, the tenth switch, the eleventh switch, the thirteenth switch, and the fourteenth switch are all turned on, and the first switch, the fourth switch, the seventh switch, the eighth switch, the ninth switch, the twelfth switch, the fifteenth switch, and the sixteenth switch are all turned off.

7. The switched-capacitor voltage conversion circuit according to claim 2, wherein the connection point between the second terminal of the third switch and the second terminal of the eleventh switch is electrically connected to a second output terminal of the switched-capacitor voltage conversion circuit.

8. The switched-capacitor voltage conversion circuit according to claim 7, wherein the switched-capacitor voltage conversion circuit is further configured to, in a first operating mode, convert the input voltage to a fourth output voltage, and output the fourth output voltage via the second output terminal.

9. The switched-capacitor voltage conversion circuit according to claim 7, wherein the switched-capacitor voltage conversion circuit is further configured to, in a second operating mode, convert the input voltage to a fifth output voltage, and output the fifth output voltage via the second output terminal.

10. The switched-capacitor voltage conversion circuit according to claim 7, wherein the switched-capacitor voltage conversion circuit is further configured to, in a third operating mode, convert the input voltage to a sixth output voltage, and output the sixth output voltage via the second output terminal.

11. A voltage converter, comprising: a switched-capacitor voltage conversion circuit, wherein the switched-capacitor voltage conversion circuit comprises: a first pathway and a second pathway; wherein a first terminal of the first pathway and a first terminal of the second pathway are both electrically connected to an input terminal of the switched-capacitor voltage conversion circuit, the input terminal of the switched-capacitor voltage conversion circuit is connected to an input voltage, a second terminal of the first pathway is electrically connected to a third terminal of the second pathway, a third terminal of the first pathway is electrically connected to a second terminal of the second pathway, a fourth terminal of the first pathway and a fourth terminal of the second pathway are both electrically connected to a first output terminal of the switched-capacitor voltage conversion circuit, and a fifth terminal of the first pathway is electrically connected to a fifth terminal of the second pathway;

the first pathway comprises a first capacitor, a second capacitor, and a first switch assembly, and the second pathway comprises a third capacitor, a fourth capacitor, and a second switch assembly, a switch assembly comprising the first switch assembly and the second switch assembly;

the switch assembly is configured to control a connection between any two of the first capacitor, the second capacitor, the third capacitor, and the fourth capacitor so that the second capacitor is connected in series to the fourth capacitor, the second capacitor and the fourth capacitor which are connected in series are connected in parallel to the third capacitor, and then a circuit formed by the second capacitor, the fourth capacitor and the third capacitor is further connected in series to the first capacitor, and finally a circuit formed by the second capacitor, the fourth capacitor, the third capacitor and the first capacitor is connected between the input terminal and the first output terminal of the switched-capacitor voltage conversion circuit, or so that the second capacitor is connected in series to the fourth capacitor, the second capacitor and fourth capacitor which are connected in series are connected in parallel to the first capacitor, and then a circuit formed by the second capacitor, the fourth capacitor and the first capacitor is further connected in series to the third capacitor, and finally a circuit formed by the second capacitor, the fourth capacitor, the first capacitor and the third capacitor is connected between the input terminal and the first output terminal of the switched-capacitor voltage conversion circuit; and the switched-capacitor voltage conversion circuit is configured to convert the input voltage to a first output voltage, and output the first output voltage via the first output terminal of the switched-capacitor voltage conversion circuit, wherein the input voltage is four times of the first output voltage.

12. The voltage converter according to claim 11, wherein the first switch assembly comprises a first switch, a second switch, a third switch, a fourth switch, a fifth switch, a sixth switch, a seventh switch, and an eighth switch; and the second switch assembly comprises a ninth switch, a tenth switch, an eleventh switch, a twelfth switch, a thirteenth switch, a fourteenth switch, a fifteenth switch, and a sixteenth switch; wherein the input terminal of the switched-capacitor voltage conversion circuit is electrically connected to a first terminal of the third switch and a first plate of the first capacitor via the second switch, and the input terminal of the switched-capacitor voltage conversion circuit is further electrically connected to a first terminal of the eleventh switch and a first plate of the third capacitor via the tenth switch; a second terminal of the third switch is electrically connected to a first terminal of the fifth switch, a second terminal of the fifth switch is electrically connected to a first terminal of the twelfth switch, a first terminal of the fourteenth switch, and a first plate of the fourth capacitor, a second terminal of the eleventh switch is electrically connected to a first terminal of the thirteenth switch, and a second terminal of the thirteenth switch is electrically connected to a first terminal of the fourth switch, a first terminal of the sixth switch, and a first plate of the second capacitor; and a connection point between the second terminal of the third switch and the second terminal of the eleventh switch is connected to a ground via a second sub-capacitor;

a second terminal of the fourth switch is electrically connected to a second plate of the first capacitor and a first terminal of the first switch, and a second terminal of the first switch is connected to the ground; and a second terminal of the twelfth switch is electrically connected to a second plate of the third capacitor and a first terminal of the ninth switch, and a second terminal of the ninth switch is connected to the ground; and a second plate of the second capacitor is electrically connected to a second terminal of the sixth switch via the seventh switch, and the second plate of the second capacitor is further connected to the ground via the eighth switch; a second plate of the fourth capacitor is electrically connected to a second terminal of the fourteenth switch via the fifteenth switch, and the second plate of the fourth capacitor is further connected to the ground via the sixteenth switch; and a connection point between the second terminal of the sixth switch and the second terminal of the fourteenth switch is connected to the ground via a first sub-capacitor.

13. The voltage converter according to claim 12, wherein the switched-capacitor voltage conversion circuit is configured to, in a first operating mode, convert the input voltage to the first output voltage, wherein the first operating mode is that the switch assembly is in a first state or a second state;

wherein in the first state, the second switch, the fourth switch, the seventh switch, the ninth switch, the eleventh switch, the thirteenth switch, the fourteenth switch, and the sixteenth switch are all turned on, and the first switch, the third switch, the fifth switch, the sixth switch, the eighth switch, the tenth switch, the twelfth switch, and the fifteenth switch are all turned off; and wherein in the second state, the second switch, the fourth switch, the seventh switch, the ninth switch, the eleventh switch, the thirteenth switch, the fourteenth switch, and the sixteenth switch are all turned off, and the first switch, the third switch, the fifth switch, the sixth switch, the eighth switch, the tenth switch, the twelfth switch, and the fifteenth switch are all turned on.

14. The voltage converter according to claim 12, wherein the switched-capacitor voltage conversion circuit is further configured to, in a second operating mode, convert the input voltage of the switched-capacitor voltage conversion circuit to a second output voltage, and output the second output voltage via the first output terminal, wherein the second operating mode is that the switch assembly is in a third state or a fourth state;

wherein in the third state, the second switch, the third switch, the fifth switch, the sixth switch, the eighth switch, the tenth switch, the eleventh switch, and the fifteenth switch are all turned on, and the first switch, the fourth switch, the seventh switch, the ninth switch, the twelfth switch, the thirteenth switch, the fourteenth switch, and the sixteenth switch are all turned off; and wherein in the fourth state, the second switch, the third switch, the seventh switch, the tenth switch, the eleventh switch, the thirteenth switch, the fourteenth switch, and the sixteenth switch are all turned on, and the first switch, the fourth switch, the fifth switch, the sixth switch, the eighth switch, the ninth switch, the twelfth switch, and the fifteenth switch are all turned off.

15. The voltage converter according to claim 12, wherein the switched-capacitor voltage conversion circuit is further configured to, in a third operating mode, convert the input voltage of the switched-capacitor voltage conversion circuit to a third output voltage, and output the third output voltage via the first output terminal;

wherein in the third operating mode, the second switch, the third switch, the fifth switch, the sixth switch, the tenth switch, the eleventh switch, the thirteenth switch, and the fourteenth switch are all turned on, and the first switch, the fourth switch, the seventh switch, the eighth switch, the ninth switch, the twelfth switch, the fifteenth switch, and the sixteenth switch are all turned off.

16. A chip, comprising: a switched-capacitor voltage conversion circuit, wherein the switched-capacitor voltage conversion circuit comprises: a first pathway and a second pathway; wherein a first terminal of the first pathway and a first terminal of the second pathway are both electrically connected to an input terminal of the switched-capacitor voltage conversion circuit, the input terminal of the switched-capacitor voltage conversion circuit is connected to an input voltage, a second terminal of the first pathway is electrically connected to a third terminal of the second pathway, a third terminal of the first pathway is electrically connected to a second terminal of the second pathway, a fourth terminal of the first pathway and a fourth terminal of the second pathway are both electrically connected to a first output terminal of the switched-capacitor voltage conversion circuit, and a fifth terminal of the first pathway is electrically connected to a fifth terminal of the second pathway;

the first pathway comprises a first capacitor, a second capacitor, and a first switch assembly, and the second pathway comprises a third capacitor, a fourth capacitor, and a second switch assembly, a switch assembly comprising the first switch assembly and the second switch assembly;

the switch assembly is configured to control a connection between any two of the first capacitor, the second capacitor, the third capacitor, and the fourth capacitor so that the second capacitor is connected in series to the fourth capacitor, the second capacitor and the fourth capacitor which are connected in series are connected in parallel to the third capacitor, and then a circuit formed by the second capacitor, the fourth capacitor and the third capacitor is further connected in series to the first capacitor, and finally a circuit formed by the second capacitor, the fourth capacitor, the third capacitor and the first capacitor is connected between the input terminal and the first output terminal of the switched-capacitor voltage conversion circuit, or so that the second capacitor is connected in series to the fourth capacitor, the second capacitor and fourth capacitor which are connected in series are connected in parallel to the first capacitor, and then a circuit formed by the second capacitor, the fourth capacitor and the first capacitor is further connected in series to the third capacitor, and finally a circuit formed by the second capacitor, the fourth capacitor, the first capacitor and the third capacitor is connected between the input terminal and the first output terminal of the switched-capacitor voltage conversion circuit; and the switched-capacitor voltage conversion circuit is configured to convert the input voltage to a first output voltage, and output the first output voltage via the first output terminal of the switched-capacitor voltage conversion circuit, wherein the input voltage is four times of the first output voltage.

17. The chip according to claim 16, wherein the first switch assembly comprises a first switch, a second switch, a third switch, a fourth switch, a fifth switch, a sixth switch, a seventh switch, and an eighth switch; and the second switch assembly comprises a ninth switch, a tenth switch, an eleventh switch, a twelfth switch, a thirteenth switch, a fourteenth switch, a fifteenth switch, and a sixteenth switch; wherein the input terminal of the switched-capacitor voltage conversion circuit is electrically connected to a first terminal of the third switch and a first plate of the first capacitor via the second switch, and the input terminal of the switched-capacitor voltage conversion circuit is further electrically connected to a first terminal of the eleventh switch and a first plate of the third capacitor via the tenth switch; a second terminal of the third switch is electrically connected to a first terminal of the fifth switch, a second terminal of the fifth switch is electrically connected to a first terminal of the twelfth switch, a first terminal of the fourteenth switch, and a first plate of the fourth capacitor, a second terminal of the eleventh switch is electrically connected to a first terminal of the thirteenth switch, and a second terminal of the thirteenth switch is electrically connected to a first terminal of the fourth switch, a first terminal of the sixth switch, and a first plate of the second capacitor; and a connection point between the second terminal of the third switch and the second terminal of the eleventh switch is connected to a ground via a second sub-capacitor;

a second terminal of the fourth switch is electrically connected to a second plate of the first capacitor and a first terminal of the first switch, and a second terminal of the first switch is connected to the ground; and a second terminal of the twelfth switch is electrically connected to a second plate of the third capacitor and a first terminal of the ninth switch, and a second terminal of the ninth switch is connected to the ground; and a second plate of the second capacitor is electrically connected to a second terminal of the sixth switch via the seventh switch, and the second plate of the second capacitor is further connected to the ground via the eighth switch; a second plate of the fourth capacitor is electrically connected to a second terminal of the fourteenth switch via the fifteenth switch, and the second plate of the fourth capacitor is further connected to the ground via the sixteenth switch; and a connection point between the second terminal of the sixth switch and the second terminal of the fourteenth switch is connected to the ground via a first sub-capacitor.

18. The chip according to claim 17, wherein the switched-capacitor voltage conversion circuit is configured to, in a first operating mode, convert the input voltage to the first output voltage, wherein the first operating mode is that the switch assembly is in a first state or a second state;

wherein in the first state, the second switch, the fourth switch, the seventh switch, the ninth switch, the eleventh switch, the thirteenth switch, the fourteenth switch, and the sixteenth switch are all turned on, and the first switch, the third switch, the fifth switch, the sixth switch, the eighth switch, the tenth switch, the twelfth switch, and the fifteenth switch are all turned off; and wherein in the second state, the second switch, the fourth switch, the seventh switch, the ninth switch, the eleventh switch, the thirteenth switch, the fourteenth switch, and the sixteenth switch are all turned off, and the first switch, the third switch, the fifth switch, the sixth switch, the eighth switch, the tenth switch, the twelfth switch, and the fifteenth switch are all turned on.

19. The chip according to claim 17, wherein the switched-capacitor voltage conversion circuit is further configured to, in a second operating mode, convert the input voltage of the switched-capacitor voltage conversion circuit to a second output voltage, and output the second output voltage via the first output terminal, wherein the second operating mode is that the switch assembly is in a third state or a fourth state;

wherein in the third state, the second switch, the third switch, the fifth switch, the sixth switch, the eighth switch, the tenth switch, the eleventh switch, and the fifteenth switch are all turned on, and the first switch, the fourth switch, the seventh switch, the ninth switch, the twelfth switch, the thirteenth switch, the fourteenth switch, and the sixteenth switch are all turned off; and wherein in the fourth state, the second switch, the third switch, the seventh switch, the tenth switch, the eleventh switch, the thirteenth switch, the fourteenth switch, and the sixteenth switch are all turned on, and the first switch, the fourth switch, the fifth switch, the sixth switch, the eighth switch, the ninth switch, the twelfth switch, and the fifteenth switch are all turned off.

20. The chip according to claim 17, wherein the switched-capacitor voltage conversion circuit is further configured to, in a third operating mode, convert the input voltage of the switched-capacitor voltage conversion circuit to a third output voltage, and output the third output voltage via the first output terminal;

wherein in the third operating mode, the second switch, the third switch, the fifth switch, the sixth switch, the tenth switch, the eleventh switch, the thirteenth switch, and the fourteenth switch are all turned on, and the first switch, the fourth switch, the seventh switch, the eighth switch, the ninth switch, the twelfth switch, the fifteenth switch, and the sixteenth switch are all turned off.

* * * * *